US008005460B2

(12) United States Patent
Chen et al.

(10) Patent No.: US 8,005,460 B2
(45) Date of Patent: Aug. 23, 2011

(54) GROUP AUTHENTICATION METHOD

(75) Inventors: Yu-Wen Chen, Taichung (TW);
Jui-Tang Wang, Keelung (TW);
Chien-Chao Tseng, Hsinchu (TW)

(73) Assignees: Industrial Technology Research Institute, Hsinchu (TW); National Chiao Tung University, Hsinchu (TW)

( * ) Notice: Subject to any disclaimer, the term of this patent is extended or adjusted under 35 U.S.C. 154(b) by 832 days.

(21) Appl. No.: 12/025,771

(22) Filed: Feb. 5, 2008

(65) Prior Publication Data

US 2009/0054036 A1 Feb. 26, 2009

(30) Foreign Application Priority Data

Aug. 24, 2007 (TW) .............................. 96131436 A

(51) Int. Cl.
*H04M 3/16* (2006.01)

(52) U.S. Cl. ..................... 455/411; 340/5.8; 379/142.05; 380/229; 380/232; 380/233

(58) Field of Classification Search .................. 455/411; 340/5.8; 379/142.05; 380/229, 232, 233
See application file for complete search history.

(56) References Cited

U.S. PATENT DOCUMENTS

| 5,668,875 | A * | 9/1997 | Brown et al. ................. 380/248 |
| 6,915,426 | B1 * | 7/2005 | Carman et al. ................ 713/168 |
| 7,683,773 | B1 * | 3/2010 | Goodall et al. ............... 340/505 |
| 2004/0151140 | A1 * | 8/2004 | Rozenblit et al. ............. 370/335 |
| 2005/0141720 | A1 * | 6/2005 | Watanabe et al. ............. 380/279 |
| 2006/0050869 | A1 * | 3/2006 | Tuvell et al. .................... 380/28 |
| 2006/0107047 | A1 * | 5/2006 | Bar-El .......................... 713/168 |
| 2007/0280169 | A1 * | 12/2007 | Cam Winget ................. 370/331 |
| 2008/0162927 | A1 * | 7/2008 | Wang et al. ................... 713/155 |

* cited by examiner

*Primary Examiner* — Jinsong Hu
*Assistant Examiner* — Qun Shen
(74) *Attorney, Agent, or Firm* — Jianq Chyun IP Office

(57) ABSTRACT

A group authentication method adaptable to a communication system is disclosed. The communication system includes a user group, a serving network, and a home network. The user group includes at least one mobile station. The home network pre-distributes a group authentication key to itself and all the mobile stations in the same user group and generates a mobile station authentication key for each mobile station. The home network generates a group list for recording related information of the user group. The home network has a database for recording the group list. The serving network has a database for recording the group list and a group authentication data received from the home network. The group authentication method includes following steps. The serving network performs an identification action to a mobile station. The communication system performs a full authentication action or a local authentication action according to the result of the identification action.

29 Claims, 24 Drawing Sheets

GROUP AUTHENTICATION METHOD

CROSS-REFERENCE TO RELATED APPLICATION

This application claims the priority benefit of Taiwan application serial no. 96131436, filed on Aug. 24, 2007. The entirety of the above-mentioned patent application is hereby incorporated by reference herein and made a part of this specification.

BACKGROUND OF THE INVENTION

1. Field of the Invention

The present invention generally relates to an authentication method, in particular, to a group authentication method.

2. Description of Related Art

Along with the emergences of different killer applications in wireless networks, various real-time communication services have also been developed. However, since data packets in a wireless network are mostly transmitted through air, the wireless network offers lower security level compared to a wired network. Besides, the bandwidth and speed of a wireless network are also much lower than those of a wired network. Together with the delay caused by authentication message relaying while roaming in different domains, the handoff time in the wireless network is considerably increased. Accordingly, how to shorten the handoff time in data transmission without damaging the security has become the focus of wireless network development.

Current authentication and key agreement (AKA) mechanisms for wireless networks are mostly designed for working with single mobile station. Taking the universal mobile telecommunications system (UMTS) AKA protocol as an example, when a mobile station roams, a local network service provider (i.e. a serving network) requests the authentication vectors of the mobile station from a home network of the mobile station, so that the serving network and the mobile station can perform authentication and master key agreement accordingly.

To meet the requirements of different wireless networks, an AKA mechanism usually includes two procedures: a. registration and authentication data distribution; and b. user authentication and key agreement. First, the serving network requests the related authentication data of the mobile station from a home network of the mobile station. Then, the serving network and the mobile station generate a series of challenge messages and response messages, and generate a master session key which can be used after the authentication succeeds.

FIG. 1 is a flowchart of the UMTS AKA authentication method adaptable to a communication system. Referring to FIG. 1, the communication system includes a mobile station MS1, a serving network SN, and a home network HN. The mobile station MS1 and the home network HN have a pre-distributed secret key K (referring to FIG. 2), and the home network HN and the mobile station MS1 have a message authentication code (MAC) generation function f1, an authentication message generation function f2, a cipher key generation function f3, and a integrity key generation function f4. The home network HN further has an authentication key generation function f5 and a plurality of authentication management fields (AMFs). The serving network SN and the home network HN respectively have a database for recording the required data during the authentication process. When the mobile station MS1 roamings, the mobile station MS1 has to perform a full authentication with the serving network SN, wherein the full authentication includes an identification step 100, an authentication vector obtaining step 101, and a user authentication and key distribution step 102. The identification step 100 and the authentication vector obtaining step 101 belong to aforementioned registration and authentication data distribution procedure, and the user authentication and key distribution step 102 belongs to abovementioned user authentication and key agreement procedure.

The UMTS AKA authentication method includes the following steps while it is applied to a communication system. First of all, the identification step 100 is executed as follows. In step 100a, the serving network SN requests the mobile station MS1 for an identification data. In step 100b, the mobile station MS1 generates the identification data and sends the identification data to the serving network SN. The identification data contains an ID of the mobile station MS1 so that the serving network SN can identify the mobile station MS1 based on the ID. In step 100c, the serving network SN receives the identification data from the mobile station MS1 and identifies the mobile station MS1, and an exclusive information field of the mobile station MS1 is established in the database of the serving network SN based on the identification data.

After that, the authentication vector obtaining step 101 is executed. In step 101a, the serving network SN sends the identification data to the home network HN and requests the authentication vectors of the mobile station MS1 from the home network HN. In step 101b, the home network HN receives the identification data and generates a plurality of authentication vectors AV(1), AV(2), . . . , AV(n) based on the identification data, and then the home network HN sends the authentication vectors AV(1)~AV(n) to the serving network SN. In step 101c, the authentication vectors AV(1)~AV(n) are stored in the database of the serving network SN.

Finally, the user authentication and key distribution step 102 is executed in following steps to complete the authentication of the mobile station MS1. In step 102a, the serving network SN selects an authentication vector AV(i) from the database thereof and sends RAND(i) and AUTN(i) in the authentication vector AV(i) to the mobile station MS1 (will be described below with reference to FIG. 2). In step 102b, the mobile station MS1 authenticates the home network HN based on RAND(i) and AUTN(i) in the authentication vector AV(i) (will be described below with reference to FIG. 3). In step 102c, the mobile station MS1 generates a mobile station authentication data RES(i) based on RAND(i) in the authentication vector AV(i) and the pre-distributed secret key K and sends the mobile station authentication data RES(i) to the serving network SN if the mobile station MS1 successfully authenticates the home network HN. In step 102d, the serving network SN receives the mobile station authentication data RES(i), and the serving network SN authenticates the mobile station MS1 based on the mobile station authentication data RES(i) and generates an authentication result. In step 102e, the serving network SN sends the authentication result to the mobile station MS1. In step 102f, the mobile station MS1 receives and confirms the authentication result. In step 102g, if the authentication result shows that the serving network SN has successfully authenticated the mobile station MS1, the serving network SN selects a cipher key CK(i) and a integrity key IK(i) to secure the later communication, and the mobile station MS1 inputs RAND(i) and the pre-distributed secret key K into the cipher key generation function f3 and the integrity key generation function f4 to calculate the cipher key CK(i) and the integrity key IK(i) correspondingly.

FIG. 2 is a diagram illustrating how the authentication vector AV(i) is generated in the UMTS AKA authentication method. Referring to FIG. 2, the home network HN searches for the secret key K of the mobile station MS1 from the database of the home network HN based on the ID of mobile station MS1 in the identification data (step 200), and generates a sequence number SQN(i) (step 201) and a random number RAND(i) (step 202). The home network HN inputs the random number RAND(i), the secret key K, the sequence number SQN(i), and a plurality of AMFs AMF into the MAC generation function f1 to generate a MAC MAC(i); the home network HN inputs the random number RAND(i) and the secret key K into the authentication message generation function f2 to generate an authentication message for eXpexted RESponse XRES(i); the home network HN inputs the random number RAND(i) and the secret key K into the cipher key generation function f3 to generate the cipher key CK(i); the home network HN inputs the random number RAND(i) and the secret key K into the integrity key generation function f4 to generate the integrity key IK(i); the home network HN inputs the random number RAND(i) and the secret key K into the anonymity key generation function f5 to generate an anonymity key AK(i); and the home network HN further performs an XOR calculation on the sequence number SQN(i) and the anonymity key AK(i) to obtain a result SQN(i)⊕AK(i) (step 203) so that the serving network SN will be unaware about the real sequence number SQN(i). The home network HN combines the result SQN(i)⊕AK(i), the AMFs AMF, and the MAC MAC(i) into an authentication token AUTN(i) (i.e. AUTN(i)={SQN(i)⊕AK(i)||AMF||MAC(i)}, wherein || represents the combination operator, for example, {110||101}={110101}). Next, the home network HN combines the random number RAND(i), the authentication message for eXpected RESponse XRES(i), the cipher key CK(i), the integrity key IK(i), and the authentication token AUTN(i) into the authentication vector AV(i) (i.e. AV(i)={RAND(i)|XRES(i)|CK(i)|IK(i)|AUTN(i)}).

FIG. 3 is a diagram illustrating how the mobile station MS1 authenticates the home network HN and generates the mobile station authentication data RES(i) based on RAND(i) and AUTN(i) sent by the serving network SN. First, the mobile station MS1 inputs the random number RAND(i) and the pre-distributed secret key K of the mobile station MS1 into the anonymity key generation function f5 to generate the anonymity key AK(i). Next, the mobile station MS1 performs an XOR calculation on the result of SQN(i)⊕AK(i) in AUTN(i) with the anonymity key AK(i) generated by the mobile station MS1 to acquire the sequence number SQN(i). The mobile station MS1 inputs the AMFs AMF, the sequence number SQN(i) derived by the mobile station MS1, and the secret key K of the mobile station MS1 into the MAC generation function f1 to generate an eXpected MAC XMAC(i). The mobile station MS1 compares the MAC XMAC(i) with the MAC MAC(i) in the AUTN(i) received from the serving network SN to authenticate the home network HN. If the result of comparison shows match which means that the mobile station MS1 successfully authenticates the home network HN, the mobile station MS1 inputs the random number RAND(i) received from the serving network SN and the secret key K of the mobile station MS1 into the authentication message generation function f2 to generate the mobile station authentication data RES(i). Meanwhile, the mobile station MS1 also inputs the secret key K of the mobile station MS1 and the random number RAND(i) received from the serving network SN into the cipher key generation function f3 and the integrity key generation function f4 to generate the cipher key CK(i) and the integrity key IK(i) which will be used to provide security for subsequent communication. The mobile station MS1 sends the mobile station authentication data RES(i) to the serving network SN. The serving network SN then compares the mobile station authentication data RES(i) with the authentication message expected RESponse XRES(i) in order to authenticate the mobile station MS1.

Either the mobile station MS1 fails to authenticate the home network HN or the serving network SN fails to authenticate the mobile station MS1, the communication system terminates the entire communication or requests re-authentication. For the convenience of description, FIG. 1 illustrates only the situation that both the authentications succeed. When a group of mobile stations perform hand off together, the UMTS AKA generates individual authentication data for each mobile stations which causes the signaling overhead between the serving network SN and the home network HN since the authentication data request and response messages are repeated and transmitted for all mobile stations in the same group.

In the UMTS AKA authentication method described above, the database of the serving network SN requires a large storage space for storing the authentication vectors AV(1)~AV(n) that support at most n authentications. Besides, in the UMTS AKA authentication method, the home network HN cannot authenticate the mobile station MS1, namely, the home network HN cannot determine whether the mobile station MS1, who requests the authentication vectors AV(1)~AV(n) from the home network HN through the serving network SN, is legitimate or not.

FIG. 4 illustrates an authentication flow when a mobile station MS1 hands off for the first time based on a UMTS X-AKA authentication method disclosed in the article "Authentication and Key Agreement Protocol for UMTS with Low Bandwidth Consumption" published in IEEE AINA 2005. The UMTS X-AKA authentication method is suitable for a communication system which includes a mobile station MS1, a serving network SN, and a home network HN. The mobile station MS1 and the home network HN both have a pre-distributed secret key. The serving network SN and the home network HN have a database respectively. When the mobile station MS1 hands off for the first time, the full authentication procedure is executed. The full authentication includes an identification step 400, an authentication data obtaining step 401, and a user authentication and key distribution step 402, where the identification step 400 and the authentication data obtaining step 401 belong to the aforementioned registration and authentication data distribution procedure, and the user authentication and key distribution step 402 belongs to the abovementioned user authentication and key agreement procedure.

The UMTS X-AKA authentication method includes the following steps while it is applied to a communication system. First, in step 400a, the serving network SN sends an identification data request to the mobile station MS1. In step 400b, the mobile station MS1 generates the identification data and a timestamp t and then sends the identification data and the timestamp t back to the serving network SN, where the identification data contains an ID of the mobile station MS1 so that the serving network SN can identify the mobile station MS1 based on the ID. In step 400c, the serving network SN receives the identification data from the mobile station MS1 and identifies the mobile station MS1 in the database of the serving network SN. If the authentication data of the mobile station MS1 is not recorded in the database, an exclusive information field for the mobile station MS1 is established in the database of the serving network SN based on the identification data and step 401 is then executed; if the authentication data and a temporary authentication key of the mobile station MS1 are recorded in the database, the serving network SN selects the authentication data and the temporary authentication key from the database, and step 501 as illustrated in FIG. 5 is executed consequently. In FIG. 4, the next step is assumed to be step 401 (for the convenience of description, the mobile station MS1 is assumed to hand off for the first time).

Next, the authentication data obtaining step 401 is executed in following steps. In step 401*a*, the serving network SN sends the identification data and the timestamp t to the home network HN and requests the authentication data of the mobile station MS1 from the home network HN. In step 401*b*, the home network HN receives the identification data and the timestamp t and generates the authentication data (containing a temporary authentication key) based on the identification data and the timestamp t, and then the home network HN sends the authentication data to the serving network SN. In step 401*c*, the authentication data and the temporary authentication key are stored in the database of the serving network SN.

Finally, the user authentication and key distribution step 402 is executed by following the steps below to complete the full authentication of the mobile station MS1. In step 402*a*, the serving network SN generates a serving network authentication data and a random number and then sends the serving network authentication data and the random number to the mobile station MS1. In step 402*b*, the mobile station MS1 authenticates the home network HN and the serving network SN based on the serving network authentication data and the random number. In step 402*c*, the mobile station MS1 generates a mobile station authentication data based on a part of the serving network authentication data and the temporary authentication key generated by the mobile station MS1, and then sends the mobile station authentication data to the serving network SN if the mobile station MS1 in step 402*b* successfully authenticates the serving network SN. In step 402*d*, after the serving network SN receives the mobile station authentication data, the serving network SN authenticates the mobile station MS1 based on the mobile station authentication data and generates an authentication result. In step 402*e*, the serving network SN sends the authentication result to the mobile station MS1. In step 402*f*, the mobile station MS1 receives and confirms the authentication result. In step 402*g*, if the authentication result shows that the serving network SN has successfully authenticated the mobile station MS1, the mobile station MS1 and the serving network SN generate a master key respectively based on the temporary authentication key and the random number generated by the serving network SN to secure the later data transmission.

FIG. 5 illustrates an authentication flow based on the UMTS X-AKA authentication method for the subsequent authentication requests after the mobile station MS1 hands off for the first time. This procedure includes an identification step 500 and a user authentication and key distribution step 501, wherein the identification step 500 belongs to aforementioned registration and authentication data distribution procedure, and the user authentication and key distribution step 501 belongs to aforementioned user authentication and key agreement procedure. The serving network SN determines whether the authentication data and temporary authentication key of the mobile station MS1 already existed in the database of the serving network SN. If the authentication data and temporary authentication key of the mobile station MS1 have been stored in the database of the serving network SN, the serving network SN stops requesting the authentication data and temporary authentication key from the home network HN. The authentication data and temporary authentication key of the mobile station MS1 can be found in the database of the serving network SN since it is not the first time that the mobile station MS1 hands off.

First, the identification step 500 is executed as follows. In step 500*a*, the serving network SN sends an identification data request to the mobile station MS1. In step 500*b*, the mobile station MS1 generates the identification data and a timestamp t and sends the identification data and the timestamp t to the serving network SN, where the identification data contains an ID of the mobile station MS1 so that the serving network SN can identify the mobile station MS1 based on the ID. In step 500*c*, the serving network SN receives the identification data generated by the mobile station MS1 and identifies the mobile station MS1. The serving network SN searches for the authentication data and temporary authentication key of the mobile station MS1 in the database of the serving network SN. If the authentication data and temporary authentication key of the mobile station MS1 are not found in the database of the serving network SN, the authentication method takes the flow as illustrated in FIG. 4. FIG. 5 illustrates the situation that the authentication data and temporary authentication key of the mobile station MS1 have been stored in the database of the serving network SN, thus, the serving network SN can locate the authentication data and temporary authentication key of the mobile station MS1 in the database.

After that, the user authentication and key distribution step 501 is executed in the following steps to complete the authentication of the mobile station MS1. In step 501*a*, the serving network SN generates a serving network authentication data and a random number and sends the serving network authentication data and the random number to the mobile station MS1. In step 501*b*, the mobile station MS1 authenticates the serving network SN based on the serving network authentication data and the random number. In step 501*c*, the mobile station MS1 generates a mobile station authentication data based on a part of the authentication data and the temporary authentication key generated previously by the mobile station MS1 and sends the mobile station authentication data to the serving network SN if the mobile station MS1 successfully authenticates the serving network SN. In step 501*d*, the serving network SN receives the mobile station authentication data, authenticates the mobile station MS1 based on the mobile station authentication data, and generates an authentication result. In step 501*e*, the serving network SN sends the authentication result to the mobile station MS1. In step 501*f*, the mobile station MS1 receives and confirms the authentication result. In step 501*g*, if the authentication result shows that the serving network SN has successfully authenticated the mobile station MS1, the mobile station MS1 and the serving network SN respectively generate a master key based on the temporary authentication key and the random number to secure the subsequent data transmission.

Additionally, either the mobile station MS1 fails to authentication the serving network SN or the home network HN or the serving network SN fails to authenticate the mobile station MS, the communication system terminates the entire communication or request re-authentication. For the convenience of description, FIG. 4 and FIG. 5 illustrate only the situation that both the authentications succeed.

According to the UMTS X-AKA authentication method, the home network HN generates a temporary authentication key for the serving network SN and authorizes the serving network SN to authenticate the mobile station MS1, so that the traffic load between the home network HN and the serving network SN can be reduced when the mobile station MS1 requests for re-authenticated. Moreover, in the UMTS X-AKA authentication method, the storage space required by the database of the serving network SN is also reduced. However, in the UMTS X-AKA authentication method, the home network HN still cannot authenticate the mobile station MS1. When a group of mobile stations perform hand off together, the UMTS X-AKA generates individual authentication data for each mobile stations which causes the signaling overhead between the serving network SN and the home network HN since the authentication data request and response messages are repeated and transmitted for all mobile stations in the same group.

FIG. 6 is a flowchart of an authentication method disclosed in U.S. Pat. No. 6,711,400. The authentication method is adaptable to a communication system which includes a mobile station MS1, a serving network SN, and a home network HN. The mobile station MS1 and the home network HN have a pre-distributed secret key, and the serving network SN and the home network HN respectively have a database. When the mobile station MS1 hands off, the mobile station MS1 has to perform a full authentication. The authentication method includes an identification step 600, an authentication data obtaining step 601, and a user authentication and key distribution step 602, where the identification step 600 and the authentication data obtaining step 601 belong to the abovementioned registration and authentication data distribution procedure, and the user authentication and key distribution step 602 belongs to the abovementioned user authentication and key agreement procedure. In this authentication method, the full authentication refers to the execution of the authentication data obtaining step 601 and the user authentication and key distribution step 602.

The authentication method includes following steps while it is applied to a communication system. First, the identification step 600 is executed in following steps. In step 600a, the mobile station MS1 generates an identification data by using the pre-distributed secret key and a first random number. The mobile station MS1 then sends the identification data and the first random number to the serving network SN, wherein the identification data contains an ID of the mobile station MS1 so that the serving network can identity the mobile station MS1 based on the ID. In step 600b, the serving network SN receives the identification data generated by the mobile station MS1 and identifies the mobile station MS1. An exclusive information field of the mobile station MS1 is established in the database of the serving network SN based on the identification data.

After that, the authentication data obtaining step 601 is executed in following steps. In step 601a, the serving network SN sends the identification data and the first random number to the home network HN and requests an authentication data of the mobile station MS1 from the home network HN. In step 601b, the home network HN receives the identification data and the first random number and selects the secret key based on the identification data. In step 601c, the home network HN generates a second random number, and then the authentication data, a cipher key, and a comparison data based on the first random number, the second random number, and the secret key. The home network HN sends the authentication data, the cipher key, the comparison data, and the second random number to the serving network SN. In step 601d, after the serving network SN receives the authentication data, the cipher key, the comparison data, and the second random number, and the cipher key and the comparison data are stored in the database of the serving network SN.

Finally, the user authentication and key distribution step 602 is executed in following steps to complete the authentication of the mobile station MS1. In step 602a, the serving network SN sends the authentication data and the second random number from the database thereof to the mobile station MS1. In step 602b, the mobile station MS1 authenticates the home network HN based on the authentication data. After the mobile station MS1 successfully authenticates the home network HN, the mobile station MS1 in step 602c generates a mobile station authentication data and a cipher key based on the pre-distributed secret key and the second random number and sends the mobile station authentication data to the serving network SN. In step 602d, the serving network SN receives the mobile station authentication data and authenticates the mobile station MS1 based on the mobile station authentication data and the comparison data in the database and then generates an authentication result. In step 602e, the serving network SN sends the authentication result to the mobile station MS1. In step 602f, the mobile station MS1 receives and confirms the authentication result. In step 602g, if the authentication result shows that the serving network SN has successfully authenticated the mobile station MS1, the mobile station MS1 and the serving network SN calculate a master key to secure the subsequent communication.

Additionally, either the mobile station fails to authenticate the home network HN or the serving network SN or the serving network SN fails to authenticate the mobile station MS1, the communication system terminates the entire communication or requests re-authentication. For the convenience of description, FIG. 6 only illustrates the situation that both the authentications succeed.

According to the authentication method disclosed in U.S. Pat. No. 6,711,400, the mobile station MS1 allocates a first random number to the home network HN to ensure the freshness of the authentication data. The serving network SN is used only for relaying the authentication data generated by the home network HN and for verifying the mobile station authentication data used for authenticating the mobile station MS1; the serving network SN is not responsible for generation any authentication data. However, in this authentication method, only one authentication data is generated every time and the generated authentication data can be used for exactly one mobile station just once. Thus, signalling overhead between the serving network SN and the home network HN is increased if the re-authentication is required or a group of mobile stations perform authentication procedures together, namely, both the traffic load between the serving network SN and the home network HN and the bandwidth wasted are increased.

However, the concept of group in wireless networks has been evolving along with the development of group communication services. Mobile stations belonging to the same home network HN often communicate in a form of group. Such a group is likely to migrate somewhere together. That is, mobile stations of an HN visit the same serving network SN or move along the same route, e.g., a tourist group from the same city or country traveling from one place to another, students having a field trip, or even mobile routers on a public transportation system. However, there is no group authentication mechanism provided in existing networks so that those roaming mobile stations of the same group have to be authenticated individually. In addition, the authentication requests and responses sent by the serving network SN and the home network HN increase the traffic load of the network, the signalling overhead, and accordingly the bandwidth between the serving network SN and the home network HN.

Foregoing authentication methods are all designed for the authentication of a single mobile station. Thus, when these authentication methods are applied to group communication, they confront the same problem: the serving network SN has to relay an authentication request regarding each mobile station to the same home network HN and then receive the authentication data of each mobile station from the home network HN at the same time. This patent proposes a new idea about shared group data for authentication. the group authentication key pre-distribution is achieved through group authentication data sharing, and on the other hand, the bandwidth used for data transmission between the serving network and the home network is reduced by adopting local authentications.

SUMMARY OF THE INVENTION

The present invention relates to a group authentication method adaptable to any communication system which requires remote authentication. The communication system includes a user group, a serving network, and a home network. The user group includes at least one mobile station. The serving network has a database for recording group lists and group authentication data received from the home network. The home network pre-distributes a group authentication key and a mobile station authentication key to the mobile station and itself. Besides, the home network has a database for recording the group lists generated by the home network. In the group authentication method, the serving network identifies the mobile station. in order to determine whether the home network has to provide an authentication data or not. If the authentication data (including the group list) of the mobile station has been stored in the database of the serving network, the serving network can directly perform a local authentication to the mobile station without informing the home network. If the authentication data of the mobile station does not exist in the database of the serving network, the serving network has to obtain the authentication data from the home network in order to perform a full authentication with the mobile station.

The mobile station and the home network have a group authentication key and a mobile station authentication key. The home network has a group list. The mobile station has a mobile station ID, a group number, and an initial value. The serving network has a database for recording the group list received from the home network. The group authentication method includes the following steps. In step (a), the mobile station generates the identification data which contains the first message authentication code (MAC) and the mobile station ID. In step (b), the identification data is transmitted to the serving network. In step (c), the serving network searches the mobile station ID in the group list in the database. If the mobile station ID is not recorded in the group list in the database, the identification data is transmitted to the home network; the home network generates the second MAC based on the identification data and then compares it with the first MAC; if the first MAC is equal to the second MAC, the home network successfully authenticates the mobile station; the home network generates a group transient key (GTK) based on the group authentication key; the home network transmit the group list and the group authentication data including GTK to the serving network; the serving network records the group list and the group authentication data in the database of the serving network. After the mobile station ID is stored in the group list in the database, the group authentication data can be found and retrieved from the database of the serving network based on the mobile station ID. In step (d), the serving network generates third MAC based on the group authentication data. In step (e), the serving network transmits a serving network authentication data which contains the third MAC to the mobile station. In step (f), the mobile station generates a GTK based on the serving network authentication data, and a fourth MAC based on the GTK just generated. In step (g), the mobile station compares the third MAC with the fourth MAC. If the third MAC is equal to the fourth MAC, the mobile station successfully authenticates the serving network and the home network. In step (h), the serving network calculates a master key based on the group authentication data. In step (i), the mobile station generates the master key and a fifth MAC based on the serving network authentication data and the GTK. In step (j), the fifth MAC is transmitted to the serving network. In step (k), the serving network generates a sixth MAC based on the group authentication data. In step (l), the serving network compares the fifth MAC with the sixth MAC. If the fifth MAC is equal to the sixth MAC, the serving network successfully authenticates the mobile station. In step (m), the data transmitted between the serving network and the mobile station is protected by the master key so that a secure communication between the serving network and the mobile station is ensured.

As described above, this invention provides a group authentication method based on a group authentication key, i.e. all the mobile stations in the same group share a group authentication key. When a mobile station in the group roams to a foreign serving network for the first time, a full authentication is required. The serving network obtains the authentication data of the mobile station and a GTK from a home network of the mobile station. Subsequently, all the other mobile stations in the same group can use this GTK for authentication directly. If the serving network tries to authenticate another mobile station of the same group, local authentication can be performed by using the GTK stored in the database of the serving network without requesting the authentication data of the mobile station from the home network again. Accordingly, in this invention, group authentication key can be pre-distributed without extra message exchange. Moreover, handoff delay caused by authentications can be reduced considerably by local authentication.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
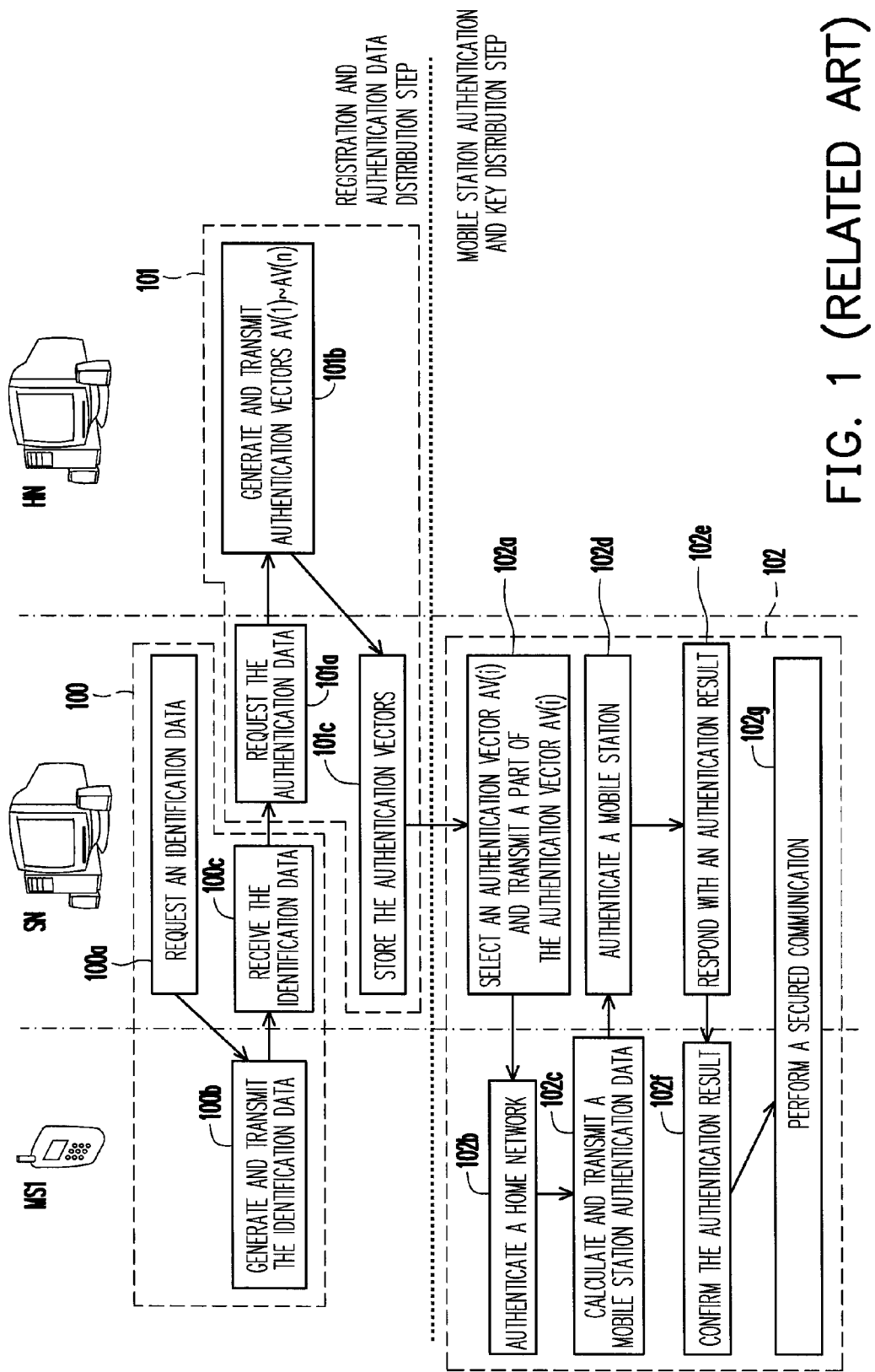
FIG. 1 is a flowchart of an UMTS AKA authentication method.
Figure 2:
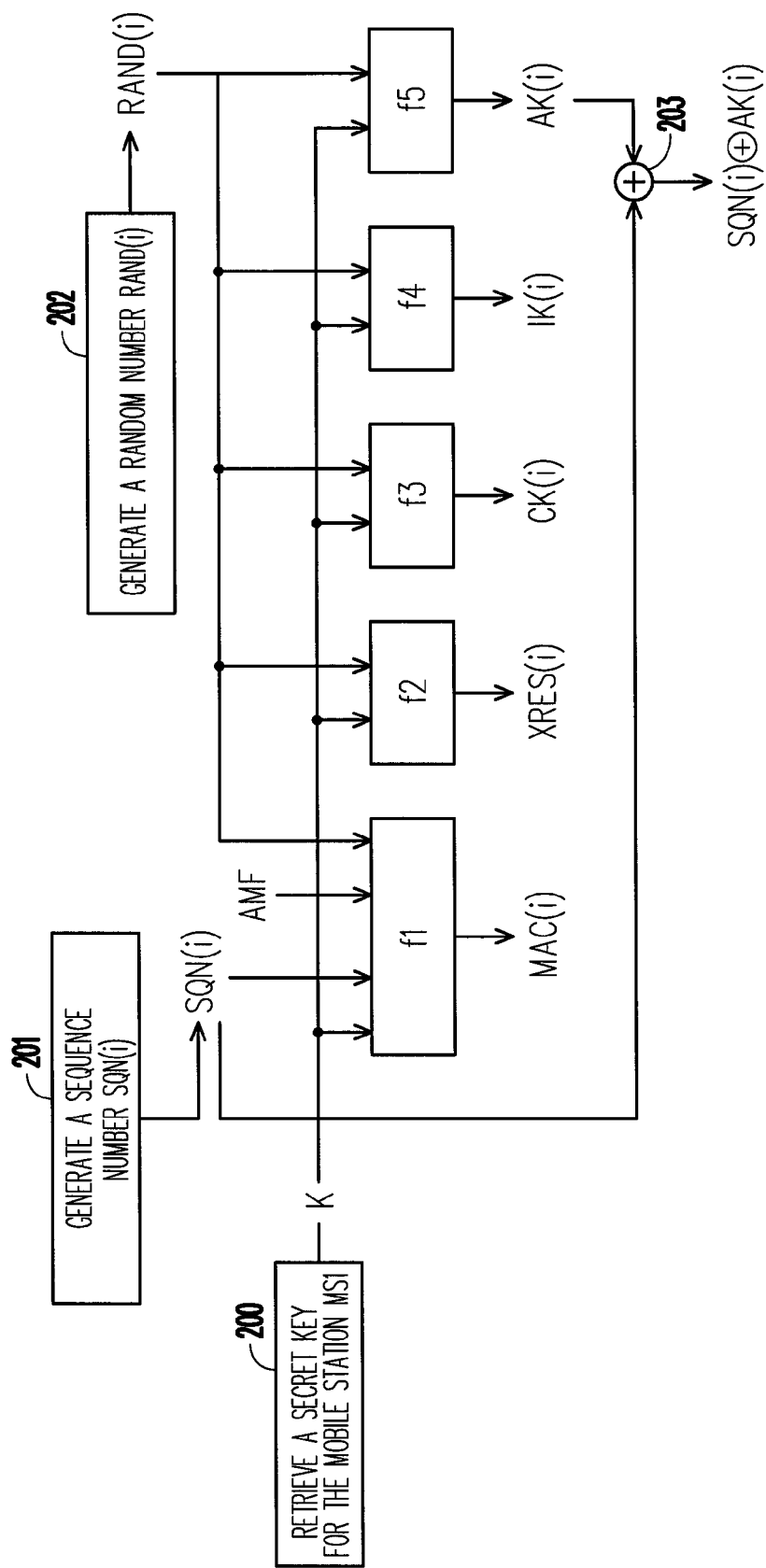
FIG. 2 illustrates how to generate an authentication vector AV(i) in the UMTS AKA authentication method.
Figure 3:
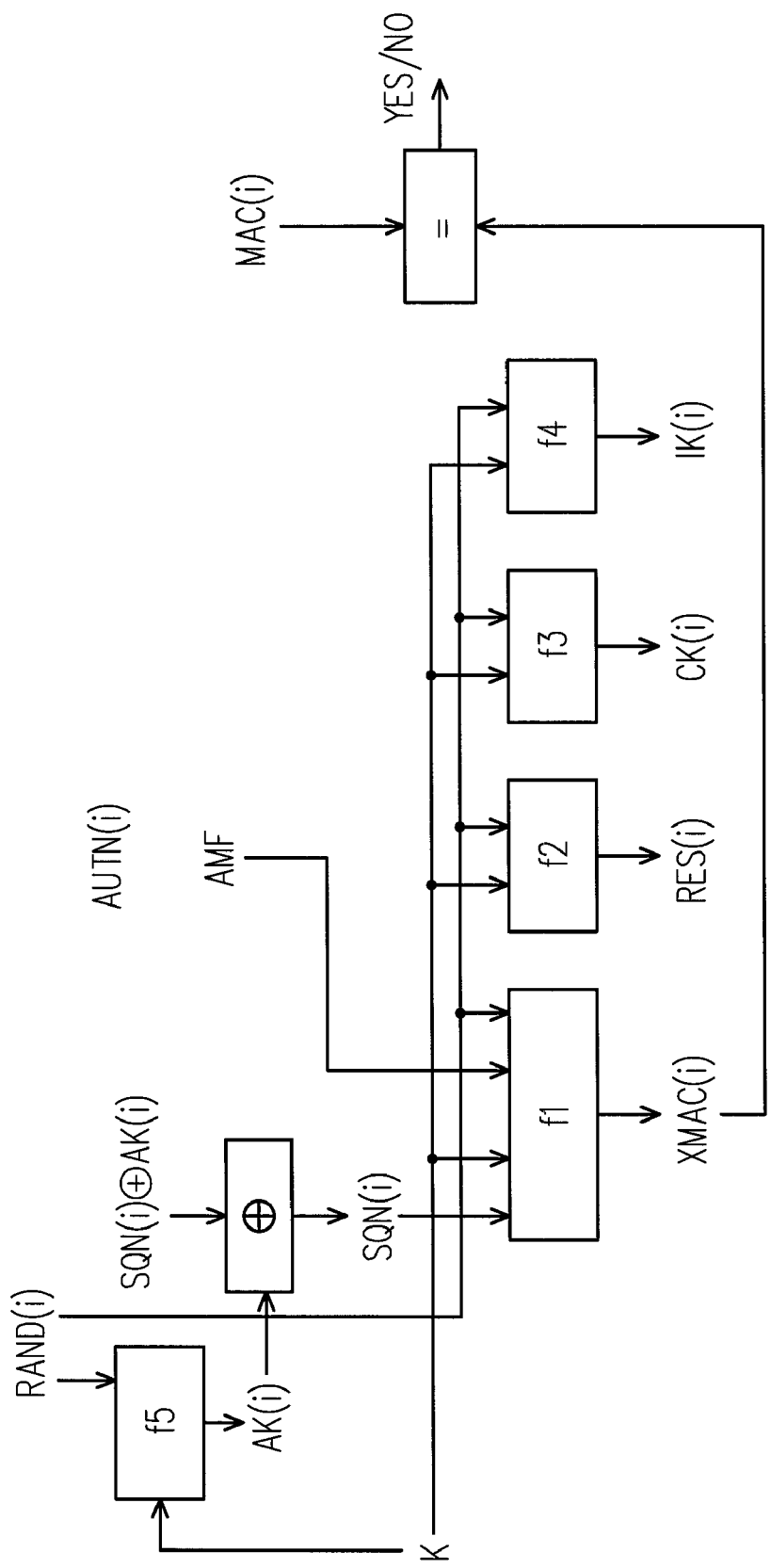
FIG. 3 illustrates how a mobile station MS1 authenticates a home network HN and generates a mobile station authentication data RES(i) based on Rand(i) and AUTN(i) sent from the serving network.
Figure 4:
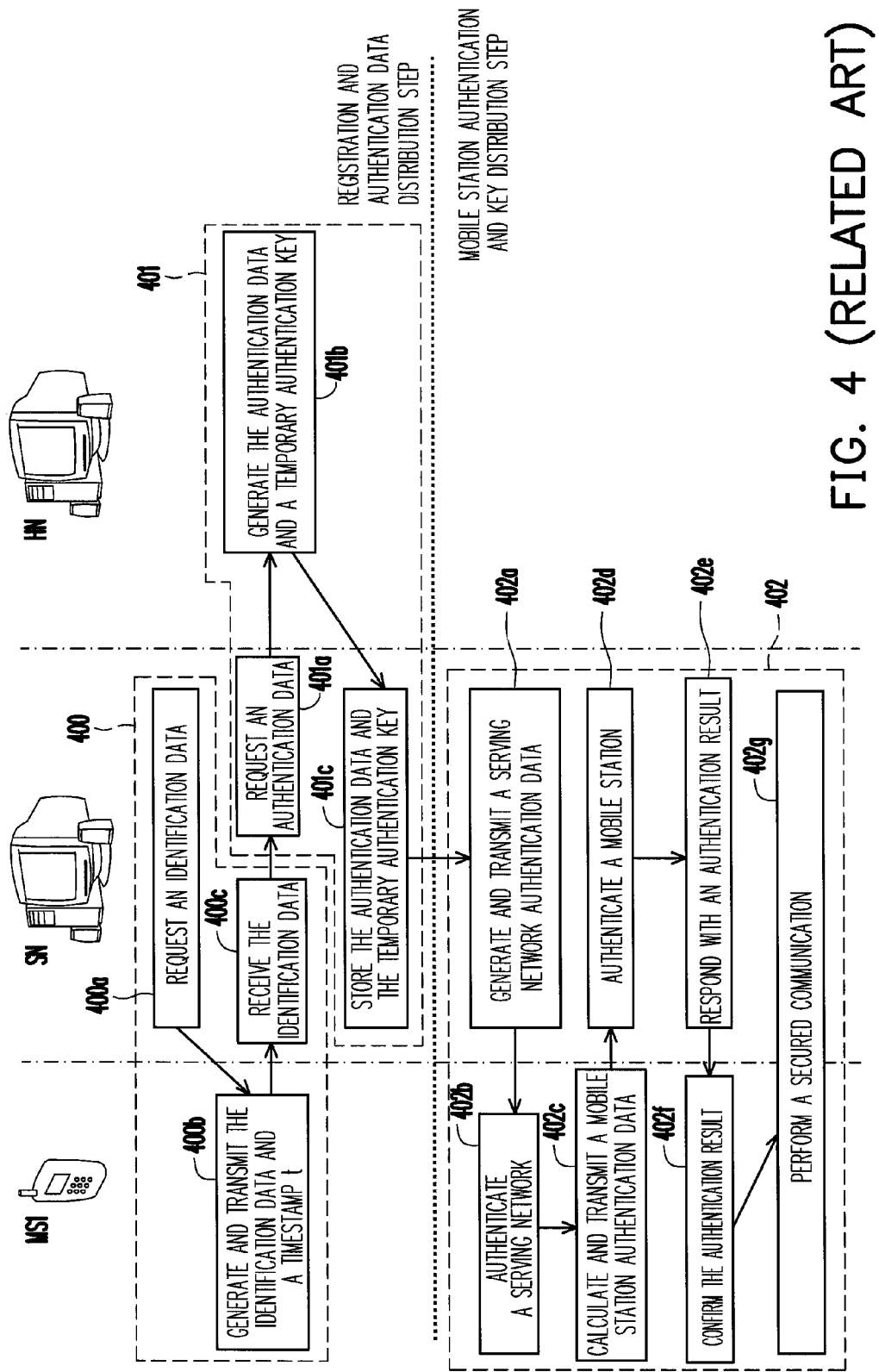
FIG. 4 illustrates an authentication flow when a mobile station MS1 hands off for the first time based on a UMTS X-AKA authentication method.
Figure 5:
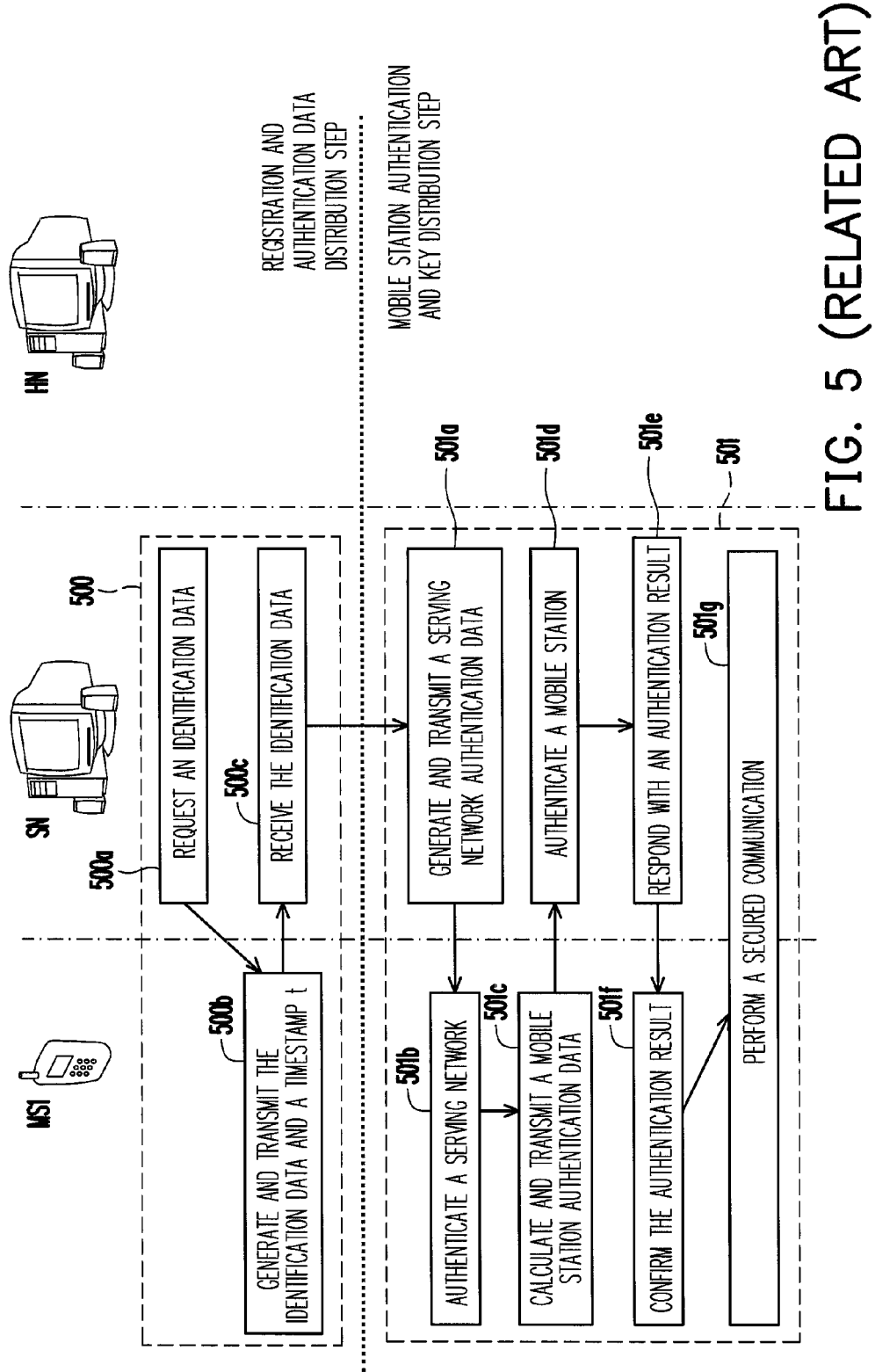
FIG. 5 illustrates an authentication flow after the mobile station MS1 hands off for the first time based on the UMTS X-AKA authentication method.
Figure 6:
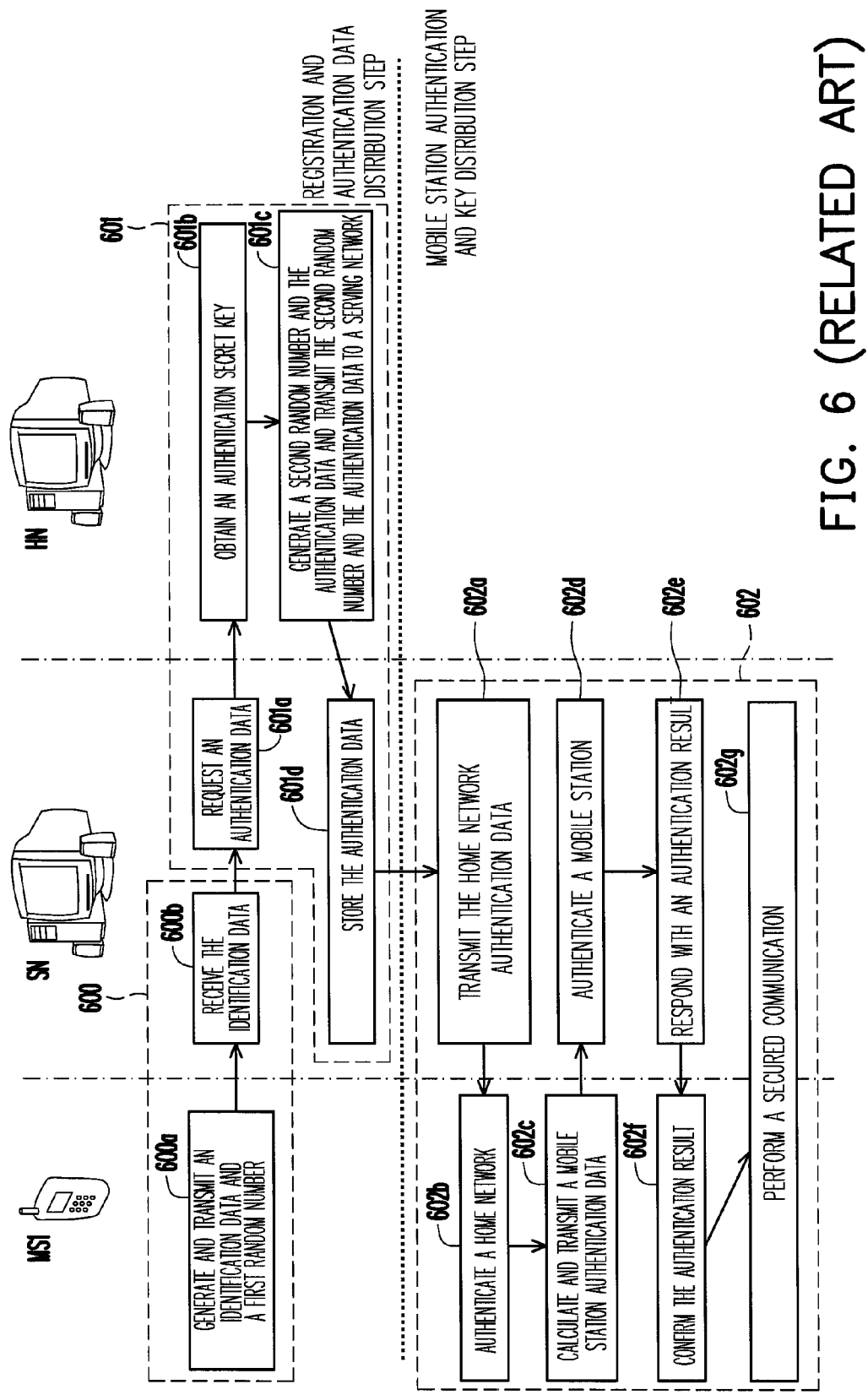
FIG. 6 is a flowchart of an authentication method disclosed in U.S. Pat. No. 6,711,400.

Examples illustrated in the accompanying drawings of reference will now be made in detail to the present preferred embodiments of the invention. Wherever possible, the same reference numbers are used in the drawings and the description to refer to the same or like parts.

Based on the concept of group communication, users living in the same community, working with the same company, or taking buses on the same route can all be considered as a group, and the members in the same group tend to roam to the same place and perform authentication. Accordingly, the present invention proposes a concept and an infrastructure of group authentication to allow the mobile stations in the same group to share a group authentication data to enhance the authentication efficiency when a group of mobile stations hand off.

Figure 7:
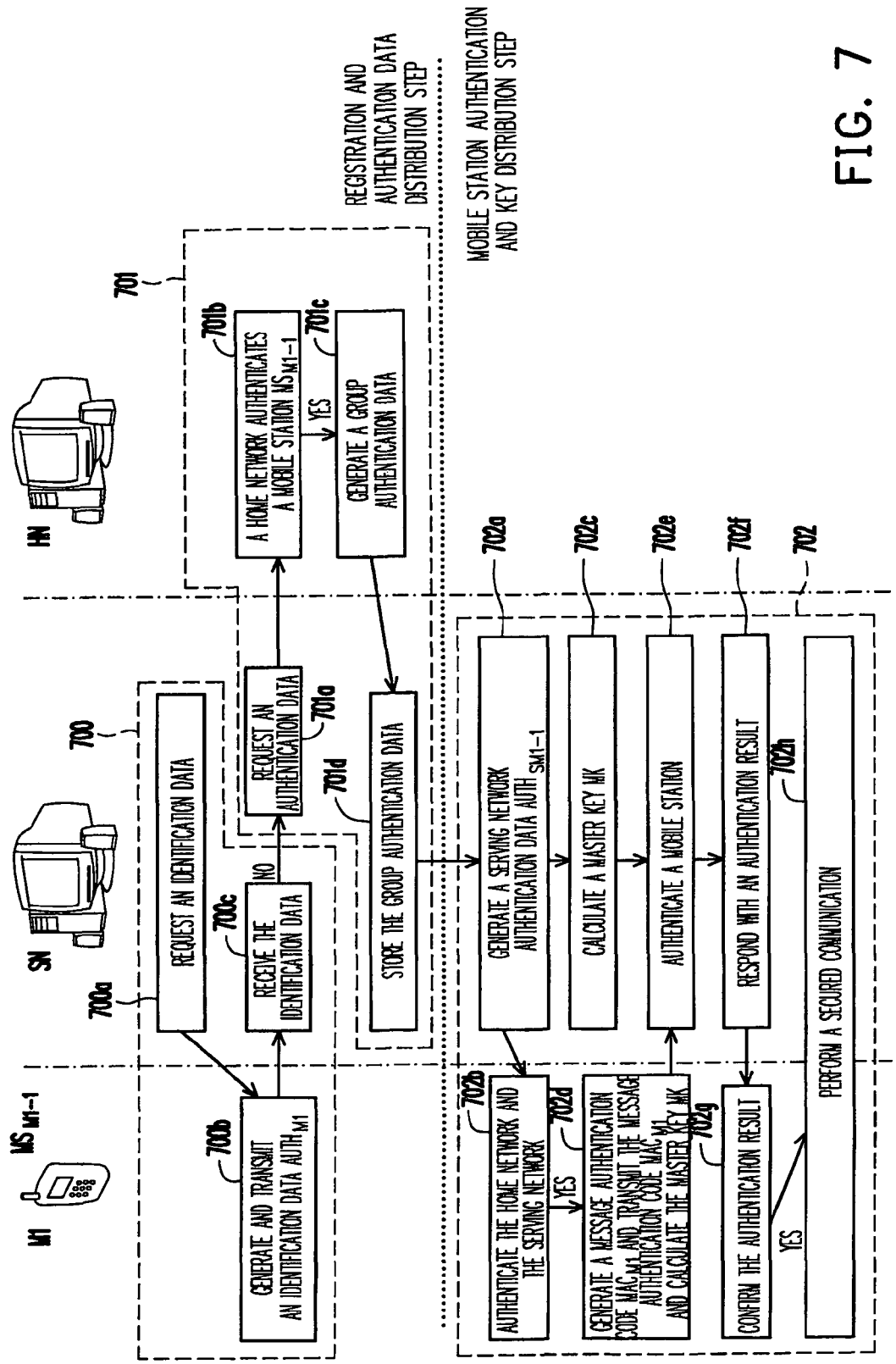
FIG. 7 is a flowchart of a group authentication method according to an exemplary embodiment of the present invention.

FIG. 7 is a flowchart of a group authentication method according to an exemplary embodiment of the present invention, in which a mobile station hands off for the first time among all the mobile stations in the same group.

The group authentication method is adaptable to a communication system which includes a mobile station group M1, a serving network SN, and a home network HN. The mobile station group M1 includes mobile stations $MS_{M1-1}$ and $MS_{M1-2}$. The home network HN allocates the mobile stations $MS_{M1-1}$ and $MS_{M1-2}$ to the mobile station group M1 before the communication system starts to transmit data. Besides, the home network HN distributes a mobile station authentication key and a group authentication key to the mobile stations $MS_{M1-1}$ and $MS_{M1-2}$ and the home network HN (i.e. the mobile stations $MS_{M1-1}$ and $MS_{M1-2}$ and the home network HN already have respectively a mobile station authentication key and a group authentication key, and the mobile station authentication keys for $MS_{M1-1}$ and $MS_{M1-2}$ are different). The home network HN resets the group authentication key when new mobile stations join or the original mobile stations leave the mobile station group M1. The home network HN and the serving network SN respectively have a database for storing group lists, group authentication data $AUTH_H$ generated by the home network, and identification data $AUTH_{M1}$ generated by the mobile stations.

As shown in the table below, the group list records a group number, a group authentication key, a mobile station ID with an initial value exclusive to each member, and other group related information, such as billing pattern etc. The group list table is indexed by the Group Number. The mobile station ID and initial value for $MS_{M1-1}$ are MS1-1 and IV1-1; for $MS_{M1-2}$ IV1-2 and MS1-2.

| Group Number | Mobile Station ID | Initial Value | Group Related Information |
|---|---|---|---|
| G1 | MS1-1 | IV1-1 | ... |
|  | MS1-2 | IV1-2 | ... |
|  | ... | ... | ... |
| ... | ... | ... | ... |

The generation and distribution of the group authentication key can be referred to "An Authenticated Group Key Agreement for Wireless Networks" (by Chik How Tan and Joseph Chee Ming Teo) published in *Wireless Communications and Networking Conference*, Vol. 4, 2005, pp. 2100-2105 and "Key Management for Multicast: Issues and Architectures" (by D. Wallner, F. Harder and R. Agee) published in *RFC2626*, June 1999. The group authentication keys for different groups are recorded and indexed by the corresponding group number in a key table stored only in the home network. The initial value IVi-j (wherein represents the $i^{th}$ group, j represents the $i^{th}$ mobile station) has too many bits to be speculated or repeated, so that the mobile stations in every group can have different initial values IVi-j. With this initial value IVi-j, a mobile station and a serving network can be synchronized in subsequent authentication procedure.

Referring to FIG. 7, the home network HN and the mobile station $MS_{M1-1}$ have a mobile station authentication message generation function f0, a serving network authentication message generation function f1, a group authentication message generation function f2, and a key generation function f3. In addition, the home network HN has a plurality of authentication management fields (AMFs) AMF. When the mobile station $MS_{M1-1}$ hands off for the first time among all the mobile stations in the group M1, the mobile station $MS_{M1-1}$ has to perform a full authentication with the serving network SN. Here the group authentication method provided by the present invention includes an identification step 700, a home network authentication step 701, and a mobile station authentication and key distribution step 702. The identification step 700 and the home network authentication step 701 belong to the aforementioned registration and authentication data distribution procedure, and the mobile station authentication and key distribution step 702 belongs to the aforementioned user authentication and key agreement procedure.

In the present invention, a full authentication action consists of the execution of the home network authentication step 701 and the mobile station authentication and key distribution step 702. As the name of full authentication implies, the serving network SN authenticates the mobile station $MS_{M1-1}$ and the mobile station $MS_{M1-1}$ also authenticates the serving network SN. Besides, the home network HN authenticates the mobile station $MS_{M1-1}$ and the mobile station $MS_{M1-1}$ also authenticates the home network HN.

Following steps are executed when the group authentication method is applied to a communication system. First, the identification step 700 includes steps 700a~700c. In step 700a, the serving network SN requests an identification data from the mobile station $MS_{M1-1}$. In step 700b, the mobile station $MS_{M1-1}$ generates the identification data $AUTH_{M1}$ and sends the identification data $AUTH_{M1}$ containing the mobile station ID to the serving network SN so that the serving network SN can identify the mobile station $MS_{M1-1}$ based on the mobile station ID MS1-1.

Next, in step 700c, the serving network SN receives the identification data $AUTH_{M1}$ generated by the mobile station MS1 and identifies the mobile station $MS_{M1-1}$. The serving network SN determines whether the mobile station ID MS1-1 has been recorded in the group list in the database thereof. Since the mobile station $MS_{M1-1}$ is the first mobile station in the group M1 who enters the serving network SN, the mobile station ID MS1-1 does not exist in the database of the serving network SN. Thus, the home network authentication step 701 is then executed. The next step may vary if the mobile station ID can be found in the group list stored in the database of the serving network SN, and which will be described below with reference to step 1601 illustrated in FIG. 16.

The home network authentication step 701 further includes steps 701a~701d. In step 701a, the serving network SN sends the identification data $AUTH_{M1}$ to the home network HN and requests the group list and the group authentication data $AUTH_H$ of the group M1 to which the mobile station $MS_{M1-1}$ belongs from the home network HN. Next, in step 701b, the home network HN authenticates the mobile station $MS_{M1-1}$ based on the identification data $AUTH_{M1}$. If the authentication succeeds, step 701b is then executed; otherwise, the communication is terminated. In FIG. 7, it is assumed that the home network HN successfully authenticates the mobile station $MS_{M1-1}$. After that, in step 701c, the home network HN generates a group authentication data $AUTH_H$ based on the identification data $AUTH_{M1}$ and sends the group authentication data $AUTH_H$ and the requested group list to the serving network SN. In step 701d, the group list and the group authentication data $AUTH_H$ are stored in the database of the serving network SN.

In FIG. 7, it is assumed that the first MAC $MAC_{M1-1}$ and the second MAC $XMAC_{M1-1}$ are the same, i.e. the home network HN successfully authenticates the mobile station $MS_{M1-1}$. Since the serving network SN requests the group authentication data $AUTH_H$ from the home network HN on behalf of the mobile station $MS_{M1-1}$, it is ensured by foregoing authentication mechanism (the comparison between the first MAC $MAC_{M1-1}$ and the second MAC $XMAC_{M1-1}$) that the serving network SN does request the group authentication data $AUTH_H$ from the home network HN instead of requesting randomly.

The mobile station authentication and key distribution step 702 further includes steps 702a~702h. First, in step 702a, the serving network SN generates a serving network authentication data $AUTH_{SM1-1}$ based on the group authentication data $AUTH_H$, the group list, and the identification data $AUTH_{M1}$ and sends the serving network authentication data $AUTH_{SM1-1}$ to the mobile station $MS_{M1-1}$. In step 702b, after receiving the serving network authentication data $AUTH_{SM1-1}$, the mobile station $MS_{M1-1}$ authenticates the serving network SN based on the serving network authentication data $AUTH_{SM1-1}$ in order to determine whether the serving network SN is a legitimate serving network authorized by the home network HN. If the serving network SN is legitimate to the mobile station $MS_{M1-1}$, step 702d is executed; otherwise, the communication is terminated or re-authentication is requested. In FIG. 7, the serving network SN is assumed to be authorized by the home network HN as a legitimate serving network to the mobile station $MS_{M1-1}$.

Thereafter, in step 702c, the serving network SN calculates a master key MK in advance for subsequent secured communication while the mobile station $MS_{M1-1}$ authenticates the serving network SN. In step 702d, the mobile station $MS_{M1-1}$ calculates the master key MK and a fifth MAC $MAC_{M1}$ based on the serving network authentication data $AUTH_{SM1-1}$ and sends the fifth MAC $MAC_{M1}$ to the serving network SN. In step 702e, the serving network SN receives the fifth MAC $MAC_{M1}$ and generates a sixth MAC $XMAC_{M1}$ based on the group list recorded in the database thereof and a group transient key (GTK) $GTK_{M1}$. The serving network SN compares the fifth MAC $MAC_{M1}$ with the sixth MAC $XMAC_{M1}$ and generates an authentication result. In step 702f, the serving network SN sends the authentication result to the mobile station $MS_{M1-1}$. In step 702g, the mobile station $MS_{M1-1}$ receives and confirms the authentication result. If the authentication result shows that the authentication succeeds, the serving network SN and the mobile station $MS_{M1-1}$ enter step 702h; otherwise, the communication is terminated. In FIG. 7, it is assumed that the authentication is successful, thus, in step 702h, the serving network SN and the mobile station $MS_{M1-1}$ generate a cipher key or an integrity key to secure subsequent communication by using the master key MK.

In aforementioned step 701b, the home network HN authenticates the mobile station $MS_{M1-1}$. If the authentication operation fails, besides terminating the entire communication, the authentication procedure may be performed again starting from step 700a or re-transmission of the identification data $AUTH_{M1}$ is requested. In aforementioned step 702b, the mobile station $MS_{M1-1}$ authenticates the serving network SN in order to determine whether the serving network SN is a legitimate serving network authorized by the home network HN to the mobile station $MS_{M1-1}$. If the serving network SN is not legitimate to the mobile station $MS_{M1-1}$, the authentication procedure may be performed again (i.e. starting from step 700a) or re-transmission of the group authentication data $AUTH_H$ or the serving network authentication data $AUTH_{SM1-1}$ may be requested besides terminating the communication.

In step 702g, if the authentication result shows that the authentication fails, the authentication may be performed again (i.e. starting from step 700a) or re-transmission of the fifth MAC $MAC_{M1}$ may be requested besides terminating the communication.

Figure 8:
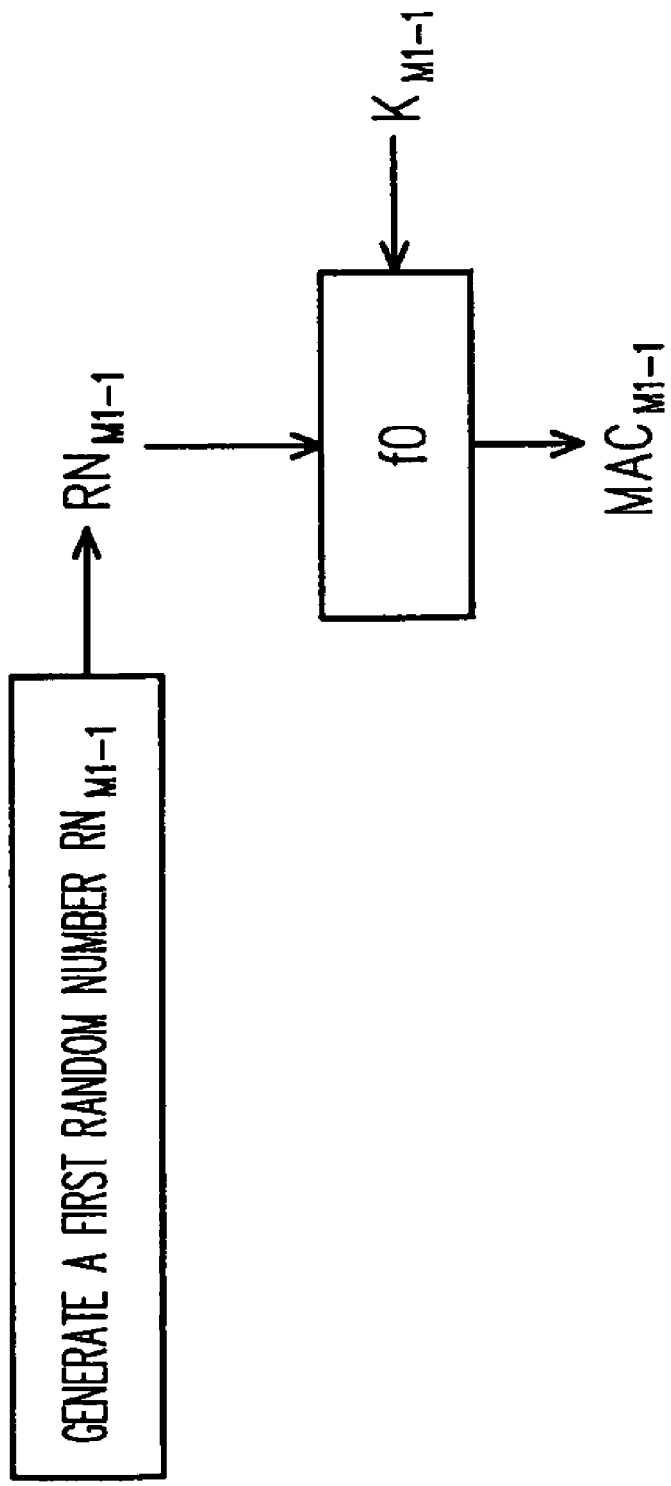
FIG. 8 illustrates a method for generating a message authentication code (MAC) $MAC_{M1-1}$ in an identification data $AUTH_{M1}$ provided by the mobile station $MS_{M1-1}$ in step 700b illustrated in FIG. 7.

FIG. 8 illustrates a method for generating the identification data $AUTH_{M1}$ in step 700b illustrated in FIG. 7 according to an exemplary embodiment of the present invention. In the present invention, the mobile station $MS_{M1-1}$ generates a first random number $RN_{M1-1}$. The mobile station $MS_{M1-1}$ inputs the first random number $RN_{M1-1}$ and a mobile station authentication key $K_{M1-1}$ into the mobile station authentication message generation function f0 to generate the first MAC $MAC_{M1-1}$. The mobile station $MS_{M1-1}$ combines the group number G1, the mobile station ID MS1-1, the first random number $RN_{M1-1}$, and the first MAC $MAC_{M1-1}$ into the identification data $AUTH_{M1}$ ($AUTH_{M1}=\{G1\|MS1-1\| RN_{M1-1}\|MAC_{M1-1}\}$).

Figure 9:
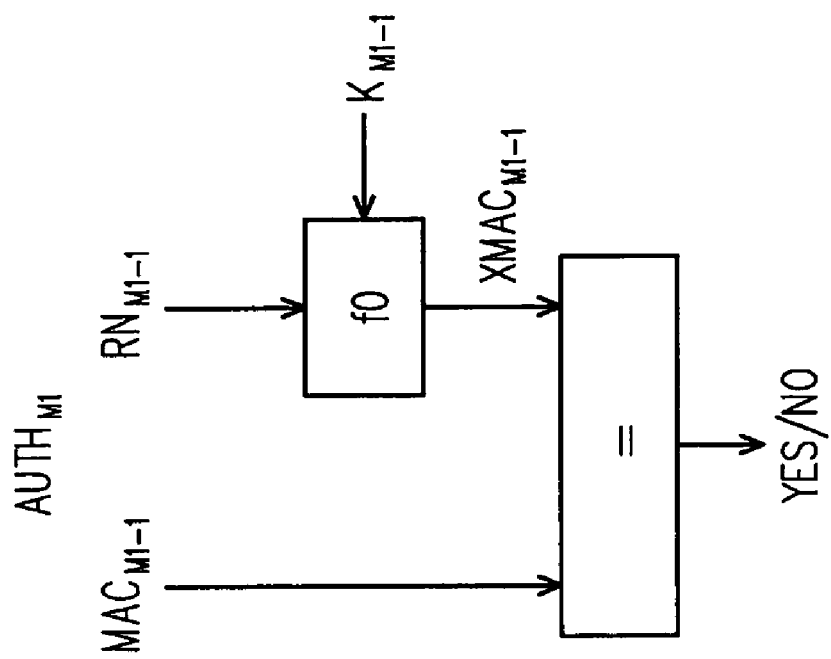
FIG. 9 illustrates how a home network HN authenticates a mobile station $MS_{M1-1}$ based on the identification data $AUTH_{M1}$ in step 701b illustrated in FIG. 7.

FIG. 9 illustrates how the home network HN authenticates the mobile station $MS_{M1-1}$ based on the identification data $AUTH_{M1}$ in step 701b illustrated in FIG. 7 according to an exemplary embodiment of the present invention. As shown in FIG. 9, the home network HN obtains the first random number $RN_{M1-1}$ in the identification data $AUTH_{M1}$ and the first MAC $MAC_{M1-1}$. The home network then inputs the first random number $RN_{M1-1}$ and the mobile station authentication key $K_{M1-1}$ stored in the home network HN into the mobile station authentication message generation function f0 to generate a second MAC $XMAC_{M1-1}$, the eXpected MAC of the mobile station $MS_{M1-1}$. The home network further compares the first MAC $MAC_{M1-1}$ with the second MAC $XMAC_{M1-1}$ generated by the home network HN. If the first MAC $MAC_{M1-1}$ is equal to the second MAC $XMAC_{M1-1}$, step 701c is then executed; otherwise, the communication is terminated.

Figure 10:
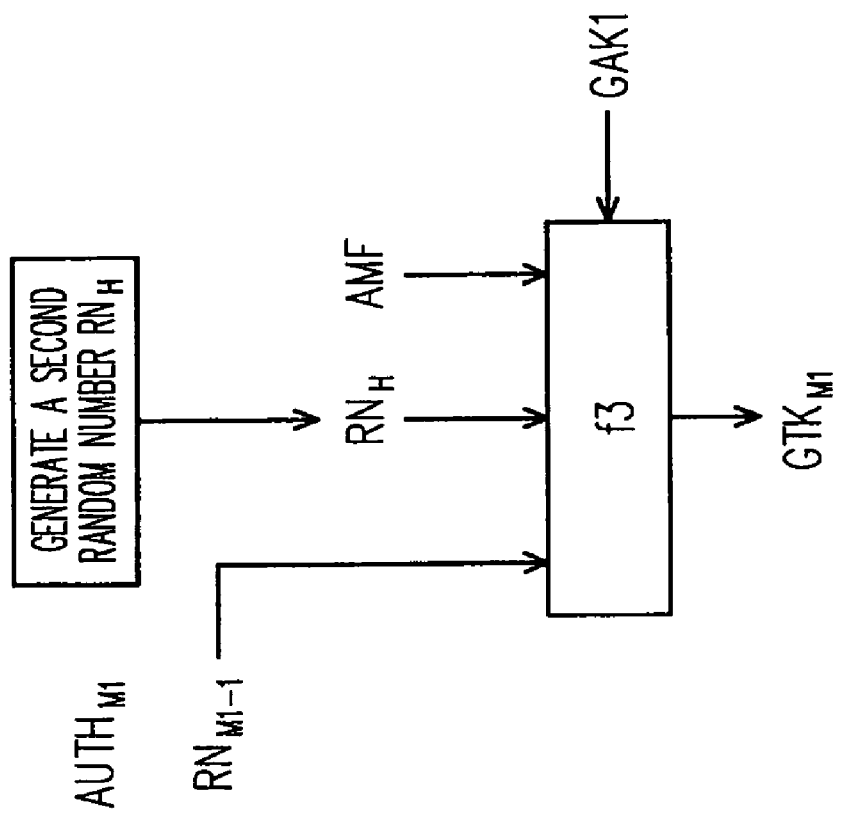
FIG. 10 illustrates how the home network HN generates a group authentication data $AUTH_H$ in step 701c illustrated in FIG. 7.

FIG. 10 illustrates a method for generating the group authentication data $AUTH_H$ in step 701c illustrated in FIG. 7 according to an exemplary embodiment of the present invention. As shown in FIG. 10, the home network HN first generates a second random number $RN_H$, and inputs the second random number $RN_H$, the group authentication key GAK1, a plurality of AMFs AMF, and the first random number $RN_{M1-1}$ in the identification data $AUTH_{M1}$ into the key generation function f3 to calculate a GTK $GTK_{M1}$ which can be used to authenticate all mobile stations in the group M1 in the serving network SN. After that, the home network HN combines the parameters required for generating the GTK $GTK_{M1}$ (the second random number $RN_H$, the AMFs AMF, and the first random number $RN_{M1-1}$) and the GTK $GTK_{M1}$ into the group authentication data $AUTH_H$ ($AUTH_H=\{RN_H\|AMF\| RN_{M1-1}\|GTK_{M1}\}$) and sends the group authentication data $AUTH_H$ to the serving network SN. Even though the first random number $RN_{M1-1}$ is generated by the mobile station $MS_{M1-1}$, since the other mobile stations in the group M1 is unaware of the random number $RN_{M1-1}$ or may change the input of the key generation function f3 to generate a new GTK, the other parameters (the second random number $RN_H$, the AMFs AMF, and the first random number $RN_{M1-1}$) excluding the group authentication key GAK1 still have to be sent to the mobile station $MS_{M1-1}$ so that the mobile station $MS_{M1-1}$ can generate the GTK $GTK_{M1}$ accordingly.

Figure 11:
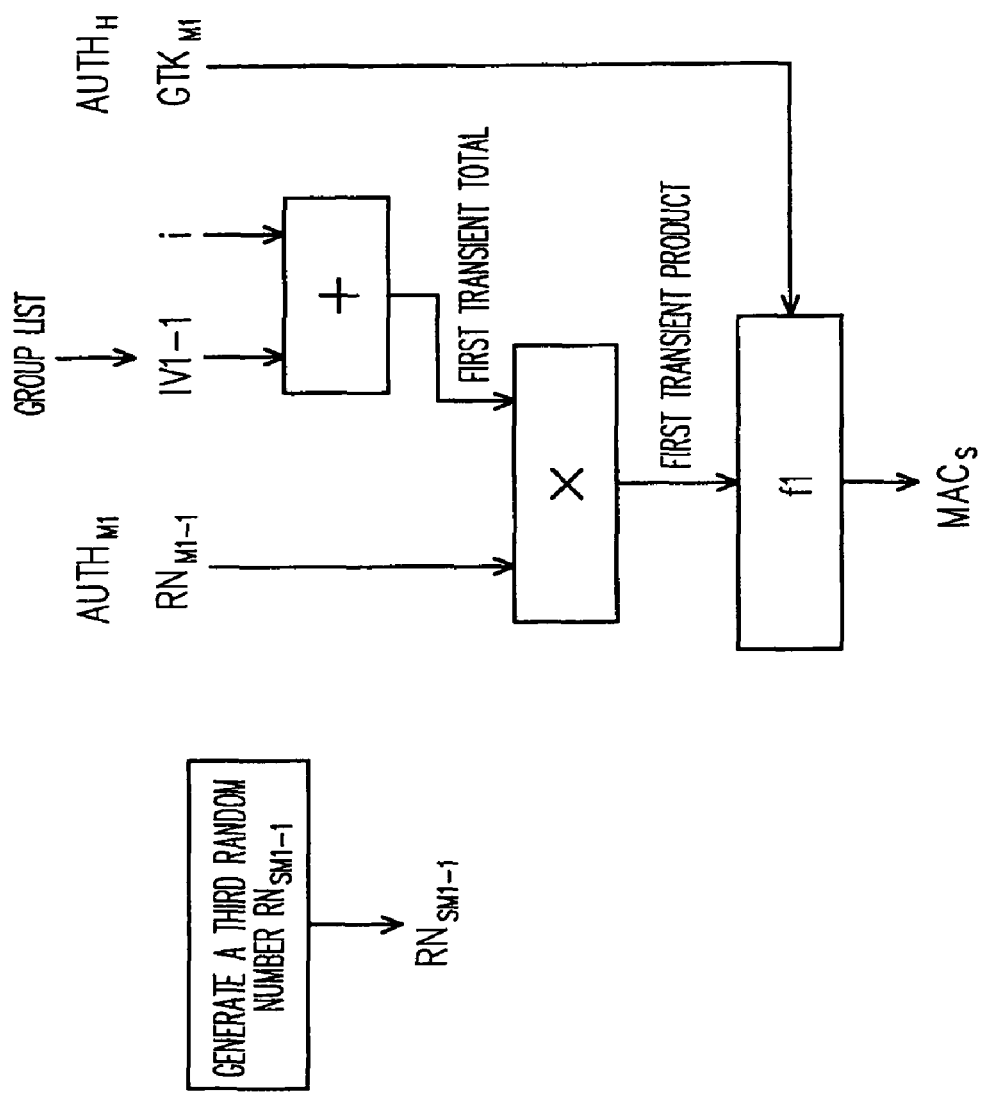
FIG. 11 illustrates a method for generating a serving network authentication data $AUTH_{SM1-1}$ in step 702a illustrated in FIG. 7.

FIG. 11 illustrates a method for generating the serving network authentication data $AUTH_{SM1-1}$ in step 702a illustrated in FIG. 7 according to an exemplary embodiment of the present invention. As shown in FIG. 11, the serving network SN adds the authentication counter of the mobile station $MS_{M1-1}$ in the serving network SN to the initial value IV1-l of the mobile station $MS_{M1-1}$ in the group list to obtain a first transient total. After that, the serving network SN multiplies the first random number $RN_{M1-1}$ in the identification data $AUTH_{M1}$ by the first transient total to obtain a first transient product. Next, the serving network SN inputs the GTK $GTK_{M1}$ in the group authentication data $AUTH_H$ and the first transient product into the serving network authentication message generation function $f^1$ to calculate a third MAC $MAC_S$.

Thereafter, the serving network SN generates a third random number $RN_{SM1-1}$. The serving network SN combines the AMFs AMF and the second random number $RN_H$ and the first random number $RN_{M1-1}$ retrieved from the group authentication data $AUTH_H$, the third MAC $MAC_S$, and the third random number $RN_{SM1-1}$ into a serving network authentication data $AUTH_{SM1-1}$ ($AUTH_{SM1-1}=\{AMF\|RN_H\| RN_{M1-1}\|MAC_S\|RN_{SM1-1}\}$), where the AMFs AMF, the second random number $RN_H$, and the first random number $RN_{M1-1}$ are necessary parameters for the mobile station $MS_{M1-1}$ to generate the GTK $GTK_{M1}$, the third MAC $MAC_S$ is for the mobile station $MS_{M1-1}$ to authenticate the serving network SN, and the third random number $RN_{SM1-1}$ is for the mobile station $MS_{M1-1}$ to calculate the fifth MAC $MAC_{M1}$ which can be used by the serving network SN to authenticate the mobile station $MS_{M1-1}$.

Figure 12:
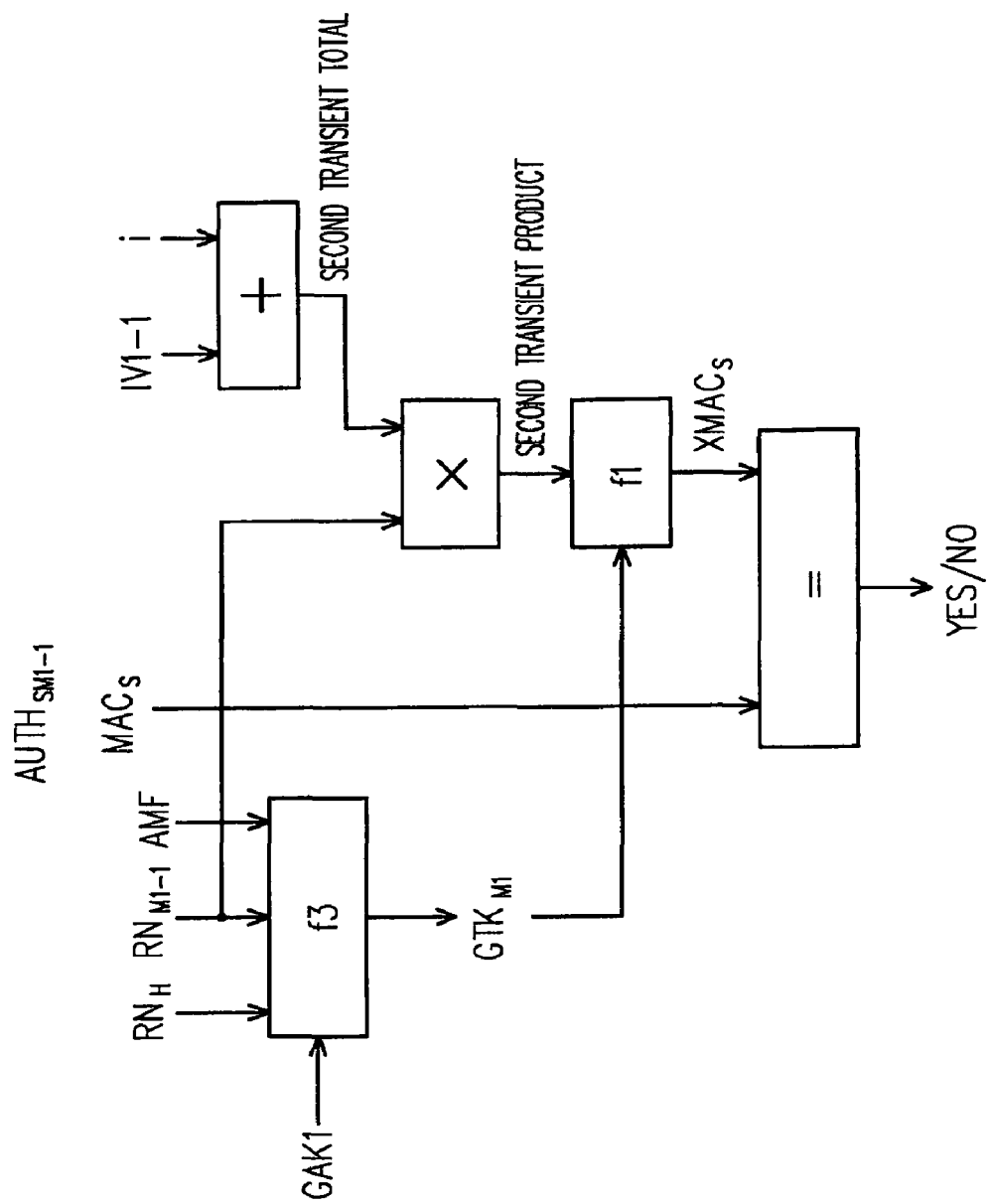
FIG. 12 illustrates how the mobile station $MS_{M1-1}$ authenticates a serving network SN in step 702b illustrated in FIG. 7.

FIG. 12 illustrates how the mobile station $MS_{M1-1}$ authenticates the serving network SN in step 702b illustrated in FIG. 7 according to an exemplary embodiment of the present invention. As shown in FIG. 12, after the mobile station $MS_{M1-1}$ receives the serving network authentication data $AUTH_{SM1-1}$, the mobile station $MS_{M1-1}$ inputs the AMFs AMF, the second random number $RN_H$, and the first random number $RN_{M1-1}$ in the serving network authentication data $AUTH_{SM1-1}$ and the group authentication key GAK1 stored in the mobile station $MS_{M1-1}$ into the key generation function f3 to generate the GTK $GTK_{M1}$. After that, the mobile station $MS_{M1-1}$ calculates a fourth MAC $XMAC_S$. Next, the mobile station $MS_{M1-1}$ adds the initial value IV1-1 of the mobile station $MS_{M1-1}$ to the authentication counter i of the mobile station $MS_{M1-1}$ in the serving network SN to obtain a second transient total. The mobile station $MS_{M1-1}$ then multiplies the second transient total by the first random number $RN_{M1-1}$ to obtain a second transient product. The mobile station $MS_{M1-1}$ inputs the second transient product and the GTK $GTK_{M1}$ into the serving network authentication message generation function f1 to generate the fourth MAC $XMAC_S$. The mobile station $MS_{M1-1}$ compares the fourth MAC $XMAC_S$ with the third MAC $MAC_S$ in the serving network authentication data $AUTH_{SM1-1}$. If the fourth MAC $XMAC_S$ is equal to the third MAC $MAC_S$, the mobile station $MS_{M1-1}$ has successfully authenticated the serving network SN, and meanwhile, the mobile station $MS_{M1-1}$ has successfully authenticated the home network HN as well for the mobile station $MS_{M1-1}$ has to generate a correct GTK $GTK_{M1}$ in order to pass the subsequent authentication.

Figure 13:
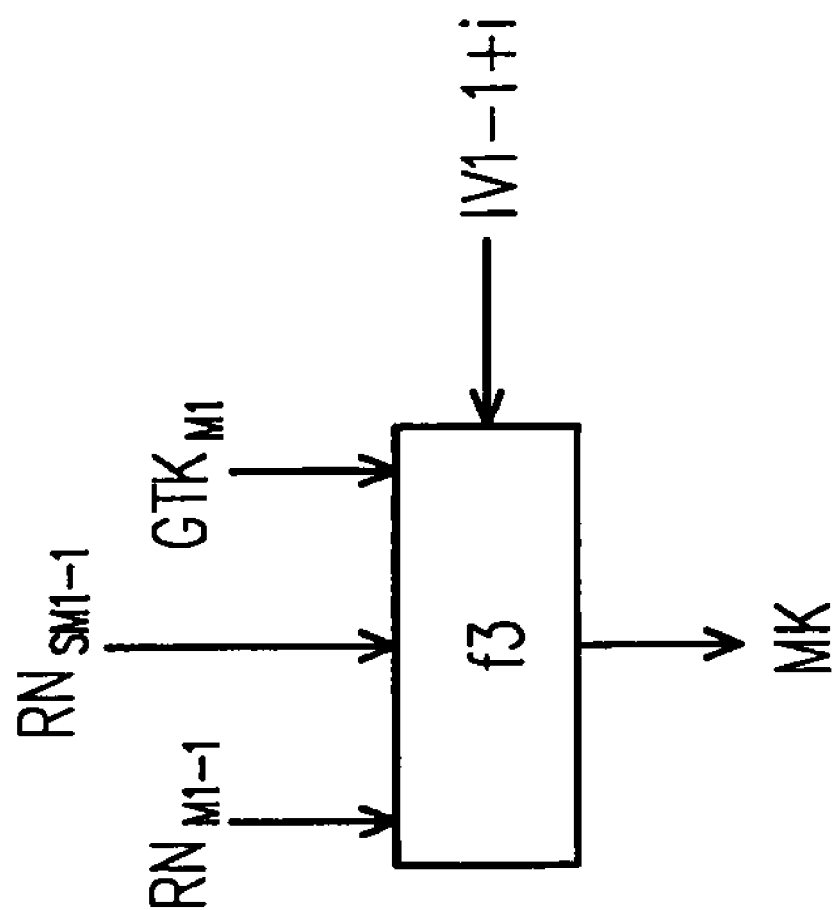
FIG. 13 illustrates a method for calculating a master key MK in step 702c illustrated in FIG. 7.

FIG. 13 illustrates a method for calculating the master key MK in step 702c illustrated in FIG. 7 according to an exemplary embodiment of the present invention. As shown in FIG. 13, the serving network SN calculates the master key MK when the mobile station $MS_{M1-1}$ verifies the serving network authentication data $AUTH_{SM1-1}$ of the serving network SN, so that the time for calculating the master key MK can be saved when later on the mobile station $MS_{M1-1}$ sends the $MAC_{M1}$ for authenticating the mobile station $MS_{M1-1}$ back to the serving network SN and the serving network SN successfully authenticates the mobile station $MS_{M1-1}$. The serving network SN inputs the first random number $RN_{M1-1}$, the third random number $RN_{SM1-1}$, the first transient total (IV1-1+i), and the GTK $GTK_{M1}$ into the key generation function f3 to calculate the master key MK.

Foregoing step 702c may also be executed after the mobile station $MS_{M1-1}$ sends the fifth MAC $MAC_{M1}$ to the serving network SN and the serving network SN successfully authenticates the mobile station $MS_{M1-1}$. However, in the present embodiment, the time required by the serving network SN for calculating the master key MK can be saved.

Figure 14:
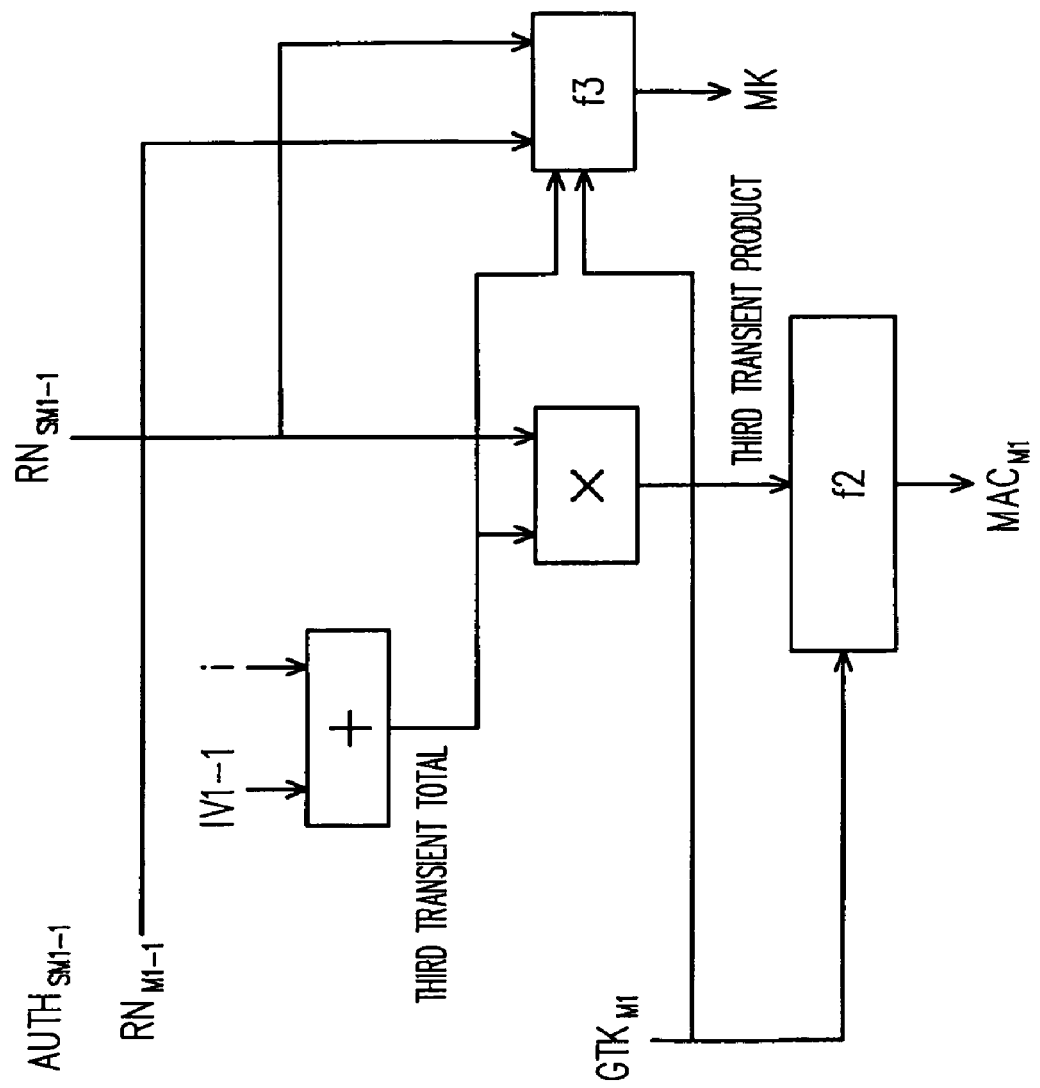
FIG. 14 illustrates a method for calculating the master key MK and generating a fifth MAC $MAC_{M1}$ in step 702d illustrated in FIG. 7.

FIG. 14 illustrates a method for calculating the master key MK and generating the fifth MAC $MAC_{M1}$ in step 702d illustrated in FIG. 7 according to an exemplary embodiment of the present invention. As shown in FIG. 14, after the mobile station $MS_{M1-1}$ successfully authenticates the serving network SN as a legitimate serving network, the mobile station $MS_{M1-1}$ generates the fifth MAC $MAC_{M1}$ which allows the serving network SN to authenticate the mobile station $MS_{M1-1}$. The mobile station $MS_{M1-1}$ first adds the initial value IV1-1 which is only known to the serving network SN and the mobile station $MS_{M1-1}$ to the authentication counter i of the mobile station $MS_{M1-1}$ in the serving network SN to obtain a third transient total, and then the mobile station $MS_{M1-1}$ multiplies the third transient total by the third random number $RN_{SM1-1}$ in the serving network authentication data $AUTH_{SM1-1}$ to obtain a third transient product.

After that, the mobile station $MS_{M1-1}$ inputs the GTK $GTK_{M1}$ and the third transient product into the group authentication message generation function f2 to calculate the fifth MAC $MAC_{M1}$ for the serving network SN to authenticate the mobile station $MS_{M1-1}$. Besides, the mobile station $MS_{M1-1}$ also inputs the first random number $RN_{M1-1}$, the third random number $RN_{SM1-1}$, the third transient total, and the GTK $GTK_{M1}$ into the key generation function f3 to calculate the master key MK for subsequent secured communication between the mobile station $MS_{M1-1}$ and the serving network SN.

Figure 15:
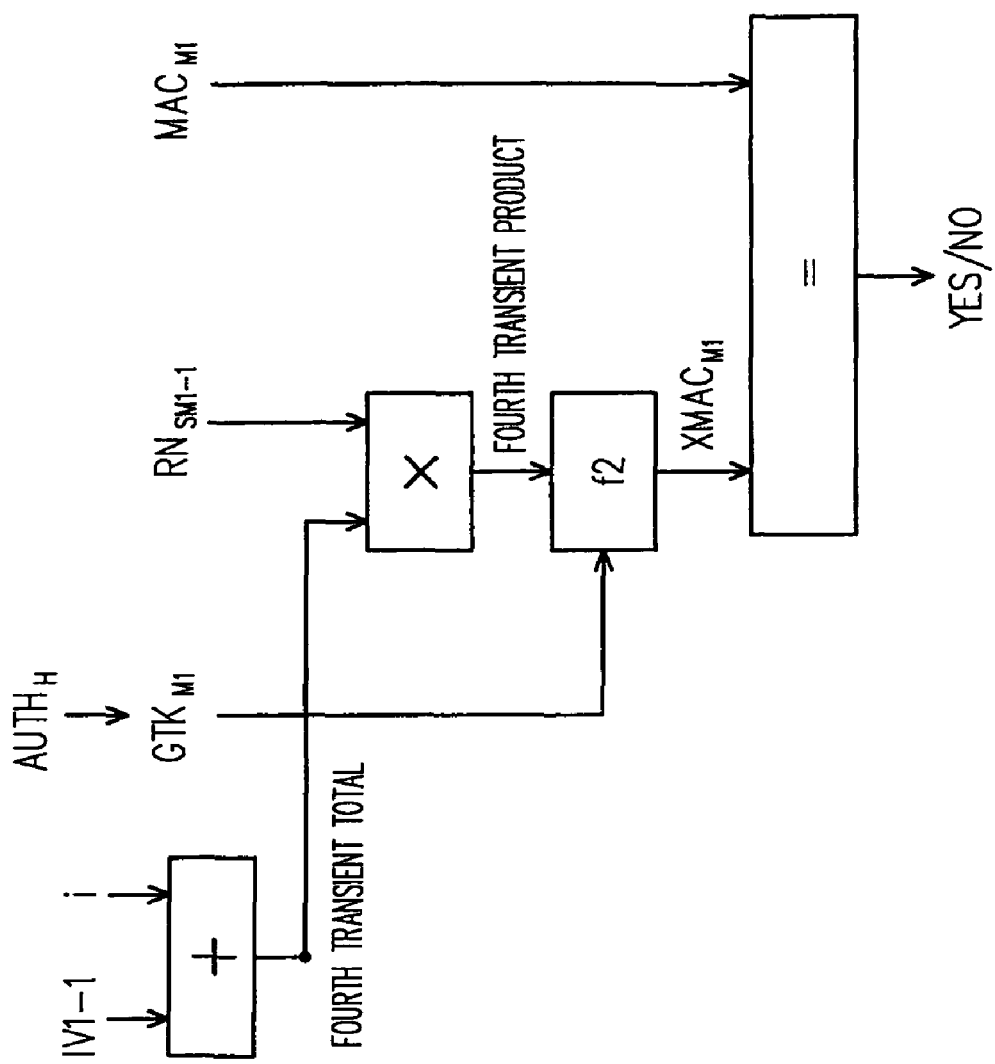
FIG. 15 illustrates a method for generating an authentication result in step 702e illustrated in FIG. 7.

FIG. 15 illustrates a method for generating the authentication result in step 702e illustrated in FIG. 7 according to an exemplary embodiment of the present invention. As shown in FIG. 15, the serving network SN first adds the number i, the authentication times performed by the mobile station $MS_{M1-1}$ to the serving network SN, to the initial value IV1-1 to obtain a fourth transient total, and then the serving network SN multiplies the fourth transient total by the third random number $RN_{SM1-1}$ to obtain a fourth transient product. After that, the serving network SN inputs the fourth transient product and the GTK $GTK_{M1}$ into the group authentication message generation function f2 to calculate a sixth MAC $XMAC_{M1}$. Finally, the serving network SN compares the sixth MAC $XMAC_{M1}$ with the fifth MAC $MAC_{M1}$ to obtain an authentication result.

Foregoing authentication methods performed by the mobile station $MS_{M1-1}$ to the serving network SN and the home network HN, by the serving network SN to the mobile station $MS_{M1-1}$, and by the home network HN to the mobile station $MS_{M1-1}$ are only an exemplary embodiment of the present invention but not for restricting the present invention. It should be understood by those skilled in the art that various changes in form and details may be made therein without departing from the spirit and scope of the present invention.

Figure 16:
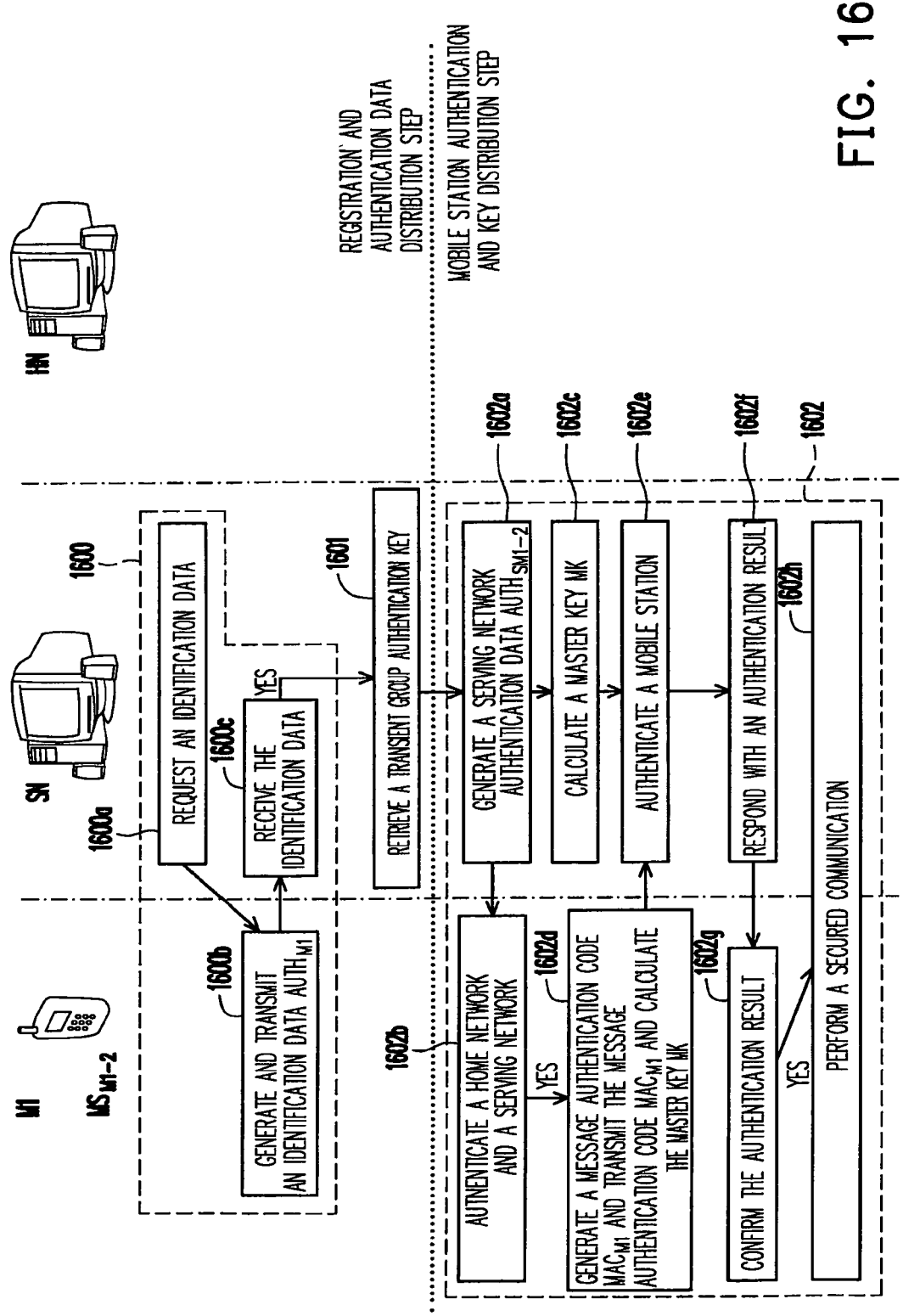
FIG. 16 is a flowchart of a group authentication method according to an exemplary embodiment of the present invention.

FIG. 16 is a flowchart of a group authentication method according to an another exemplary embodiment of the present invention, wherein the mobile station $MS_{M1-2}$ is not the first mobile station which hands off among all the mobile stations in the same group M1. Since the mobile station $MS_{M1-2}$ is not the first handoff mobile station in the group M1, the serving network SN can directly obtain the GTK $GTK_{M1}$ from the database thereof and transmits the necessary parameters for generating $GTK_{M1}$ to the mobile station $MS_{M1-2}$. Thus, after the mobile station $MS_{M1-2}$ has obtained the parameters for generating the GTK $GTK_{M1}$ and has calculated the GTK $GTK_{M1}$, the mobile station $MS_{M1-2}$ and the serving network SN can directly authenticate each other without requesting assistant from the home network HN. The traffic load between the home network HN and the serving network SN can be reduced.

Additionally, the mobile station $MS_{M1-2}$ may also request the serving network SN to perform a full authentication as illustrated in FIG. 7, namely, the serving network SN can determine whether a full authentication is to be performed based on the message received from the mobile station $MS_{M1-2}$, and the serving network SN can send an authentication message back to the home network HN and request a fresh group authentication data $AUTH_H$. The group authentication method illustrated in FIG. 16 includes an identification step 1600, a GTK retrieving step 1601, and a mobile station authentication and key distribution step 1602, wherein the identification step 1600 and the GTK retrieving step 1601 belong to aforementioned registration and authentication data distribution procedure, and the mobile station authentication and key distribution step 1602 belongs to aforementioned user authentication and key agreement procedure. In the present invention, local authentication refers to the execution of the GTK retrieving step 1601 and the mobile station authentication and key distribution step 1602. As the name of local authentication implies, the serving network SN only authenticates the mobile station $MS_{M1-2}$ and does not request the home network HN to authenticate the mobile station $MS_{M1-2}$.

First, the identification step 1600 further includes steps 1600a-1600c. In step 1600a, the serving network SN requests an identification data from the mobile station $MS_{M1-2}$. Next, in step 1600b, the mobile station $MS_{M1-2}$ generates the identification data $AUTH_{M1}$ and sends the identification data $AUTH_{M1}$ to the serving network SN, wherein the identification data $AUTH_{M1}$ contains a mobile station ID MS1-2 of the mobile station $MS_{M1-2}$ so that the serving network SN can identify the mobile station $MS_{M1-2}$ based on the mobile station ID MS1-2. Then in step 1600c, the serving network SN receives the identification data $AUTH_{M1}$ generated by the mobile station $MS_{M1-2}$ and identifies the mobile station $MS_{M1-2}$. The serving network SN determines whether the mobile station ID MS1-2 is recorded in the group list in the database of the serving network SN.

Since the mobile station $MS_{M1-2}$ is not the first mobile station which enters the serving network SN among all the mobile stations in the group M1, mobile station ID MS1-2 is already recorded in the group list in the database of the serving network SN, thus, the entire procedure proceeds to the GTK retrieving step 1601. Besides, the mobile station $MS_{M1-2}$ may also request the serving network SN to perform a full authentication action as illustrated in FIG. 7. For example, a flag is further attached into the identification data $AUTH_{M1}$ to indicate whether the serving network SN has to perform a full authentication or not even though the mobile station ID MS1-2 has been recorded in the group list in the database of the serving network SN. In FIG. 16, it is assumed that the mobile station $MS_{M1-2}$ does not request the serving network SN to perform a full authentication action as illustrated in FIG. 7.

The GTK retrieving step 1601 includes the following step. The serving network SN retrieves the group authentication data $AUTH_H$ of the group M1 of the mobile station $MS_{M1-2}$ from the database of the serving network SN, where the group authentication data $AUTH_H$ contains the GTK $GTK_{M1}$ ($AUTH_H$={$RN_H$∥AMF∥$RN_{M1-1}$∥$GTK_{M1}$}). After that, the mobile station authentication and key distribution step 1602 is executed.

The mobile station authentication and key distribution step 1602 further includes steps 1602a~1602h. In step 1602a, the serving network SN generates a serving network authentication data $AUTH_{SM1-2}$ based on the group authentication data $AUTH_H$ and sends the serving network authentication data $AUTH_{SM1-2}$ to the mobile station $MS_{M1-2}$. After that, in step 1602b, the mobile station $MS_{M1-2}$ receives the serving network authentication data $AUTH_{SM1-2}$ and authenticates the serving network SN based on the serving network authentication data $AUTH_{SM1-2}$ in order to determine whether the serving network SN is a legitimate serving network authorized by the home network HN. If the serving network SN is legitimate to the mobile station $MS_{M1-2}$, step 1602d is executed; otherwise, the communication is terminated. In FIG. 16, it is assumed that the serving network SN is legitimate to the mobile station $MS_{M1-2}$.

Thereafter, in step 1602c, the serving network SN calculates a master key MK for subsequent secured communication while the mobile station $MS_{M1-2}$ authenticates the serving network SN. Next, in step 1602d, the mobile station $MS_{M1-2}$ calculates the master key MK and a fifth MAC $MAC_{M1}$ based on the serving network authentication data $AUTH_{SM1-2}$ and sends the fifth MAC $MAC_{M1}$ to the serving network SN. In step 1602e, the serving network SN receives the fifth MAC $MAC_{M1}$ and then generates a sixth MAC $XMAC_{M1}$, the eXpected MAC of the aforementioned fifth MAC $MAC_{M1}$, based on the GTK $GTK_{M1}$ and the information recorded in the group list in the database thereof, and the serving network SN then compares the fifth MAC $MAC_{M1}$ and the sixth MAC $XMAC_{M1}$ and generates an authentication result.

In step 1602f, the serving network SN sends the authentication result to the mobile station $MS_{M1-2}$. In step 1602g, the mobile station $MS_{M1-2}$ confirms the authentication result. If the authentication result shows that the authentication succeeds, the serving network SN and the mobile station $MS_{M1-2}$ enter step 1602h; otherwise, if the authentication result shows that the authentication fails, the communication is terminated. In FIG. 16, it is assumed that the authentication is successful. In step 1602h, the serving network SN and the mobile station $MS_{M1-2}$ use the master key MK to secure the subsequent communication.

In foregoing step 1602b, the mobile station $MS_{M1-2}$ authenticates the serving network SN and determines whether the serving network SN is a legitimate serving network authorized by the home network HN. If the serving network SN is not legitimate to the mobile station $MS_{M1-2}$, the authentication action may be performed again (starting from step 1600a) or the serving network authentication data $AUTH_{SM1-1}$ may be re-transmitted besides terminating the communication. In step 1602g, if the authentication result shows that the authentication fails, the authentication action may be performed again (starting from step 1600a) or the fifth MAC $MAC_{M1}$ may be re-transmitted besides terminating the communication.

Figure 17:
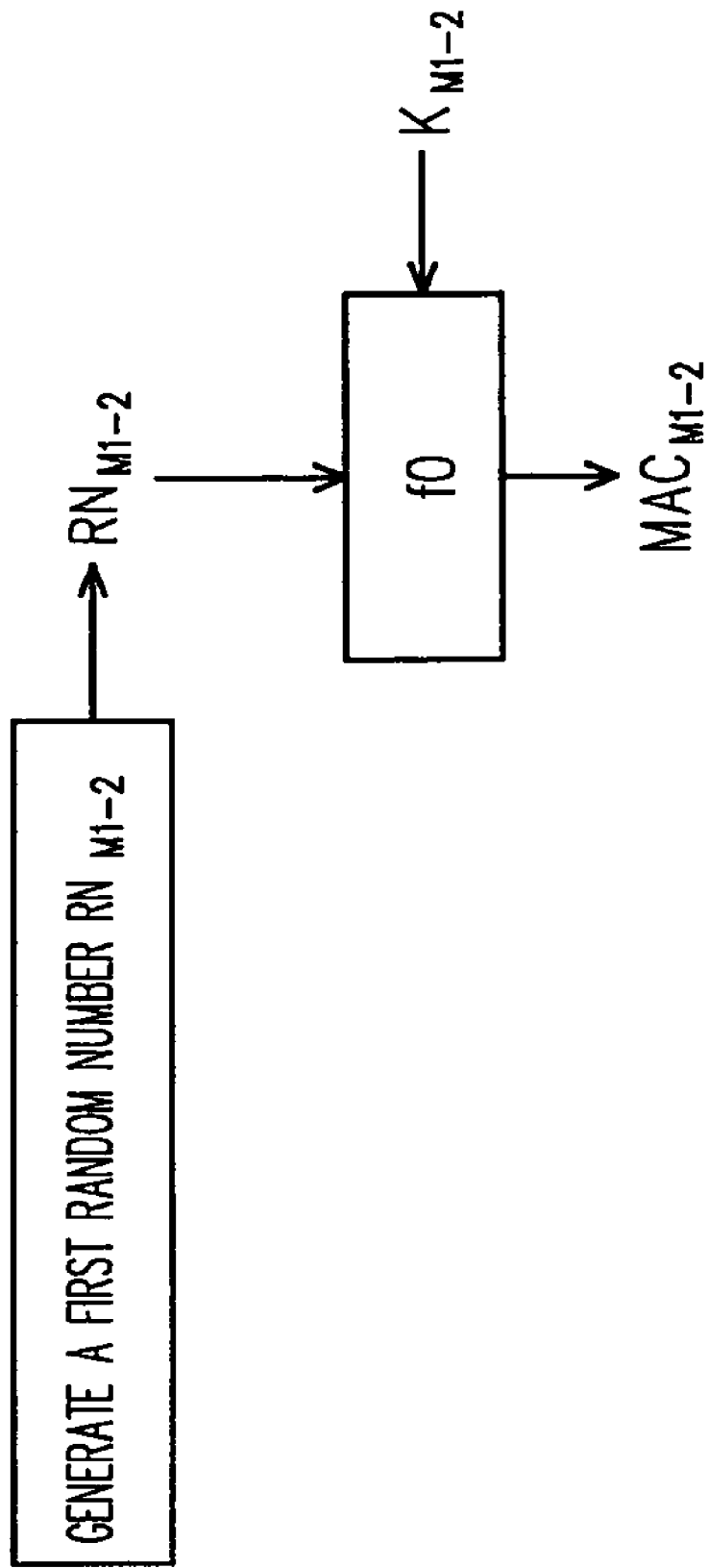
FIG. 17 illustrates a method for generating an identification data $AUTH_{M1}$ in step 1600b illustrated in FIG. 16.

FIG. 17 illustrates a method for generating the identification data $AUTH_{M1}$ in step 1600b illustrated in FIG. 16 according to an exemplary embodiment of the present invention. In the present embodiment, the mobile station $MS_{M1-2}$ generates a first random number $RN_{M1-2}$. The mobile station $MS_{M1-2}$ inputs the first random number $RN_{M1-2}$ and a mobile station authentication key $K_{M1-2}$ into the mobile station authentication message generation function f0 to generate a first MAC $MAC_{M1-2}$. The mobile station $MS_{M1-2}$ combines a group number G1, the mobile station ID MS1-2, the first random number $RN_{M1-2}$, and the first MAC $MAC_{M1-2}$ into an identification data $AUTH_{M1}$ ($AUTH_{M1}=\{G1\|MS1\text{-}2\|RN_{M1-2}\|MAC_{M1-2}\}$).

Figure 18:
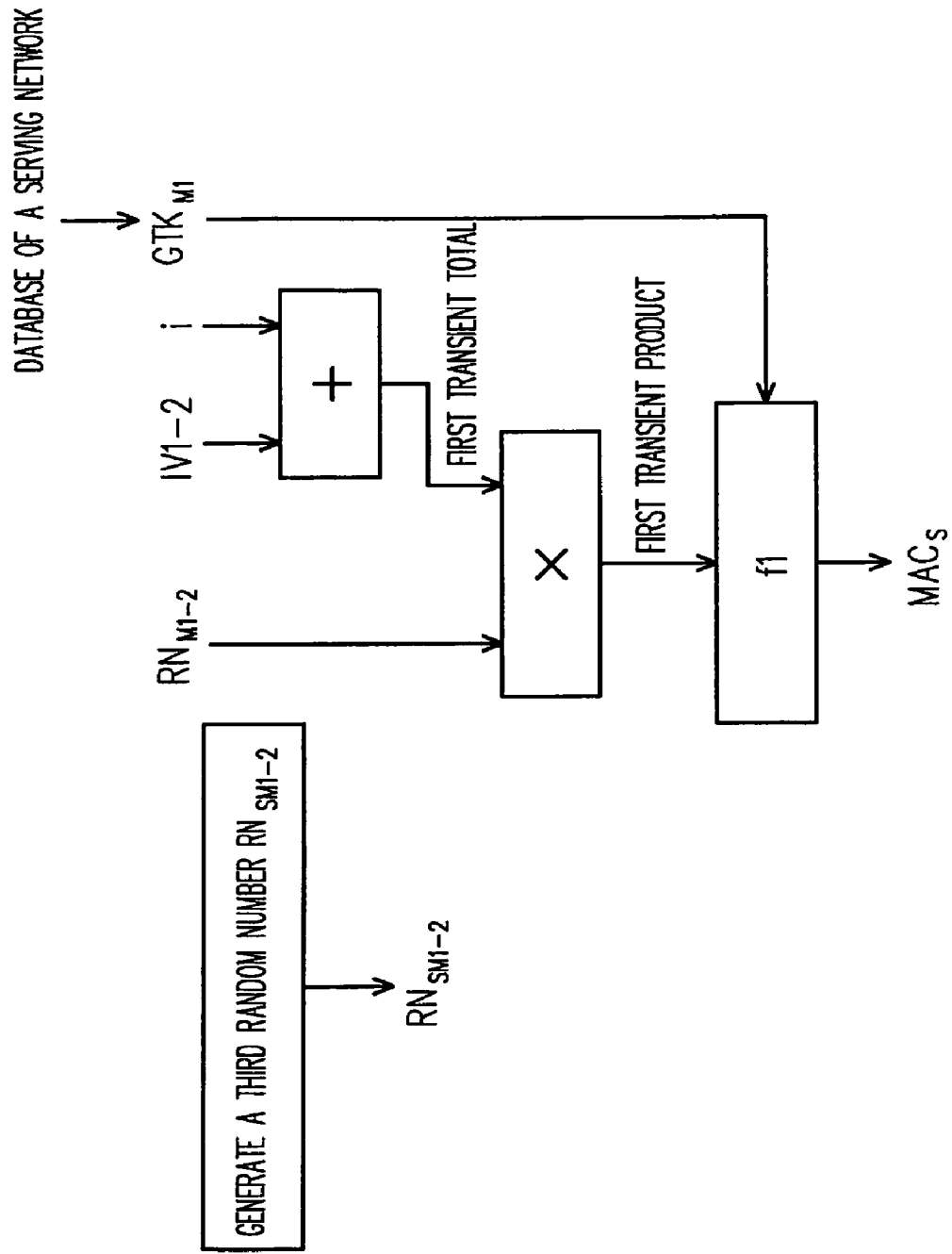
FIG. 18 illustrates a method for generating a serving network authentication data $AUTH_{SM1-2}$ in step 1602a illustrated in FIG. 16.

FIG. 18 illustrates a method for generating the serving network authentication data $AUTH_{SM1-2}$ in step 1602a illustrated in FIG. 16 according to an exemplary embodiment of the present invention. In the present embodiment, the serving network SN first adds the authentication counter i of the mobile station $MS_{M1-2}$ in the serving network SN to the initial value IV1-2 of the mobile station $MS_{M1-2}$ in the group list to obtain a first transient total. After that, the serving network SN multiplies the first random number $RN_{M1-2}$ in the mobile station identification data $AUTH_{M1}$ by the first transient total to obtain a first transient product. Next, the serving network SN retrieves the GTK $GTK_{M1}$ from the database thereof and inputs the GTK $GTK_{M1}$ and the first transient product into the serving network authentication message generation function f1 to calculate a third MAC $MAC_S$. Then, the serving network SN generates a third random number $RN_{SM1-2}$, and the serving network SN combines the AMFs AMF and the second random number $RN_H$ retrieved from the database thereof, the first random number $RN_{M1-1}$ in the identification data $AUTH_{M1}$, the third MAC $MAC_S$, and the third random number $RN_{SM1-2}$ into the serving network authentication data $AUTH_{SM1-2}$ ($AUTH_{SM1-2}=\{AMF\|RN_H\|RN_{M1-1}\|MAC_S\|RN_{SM1-2}\}$). The AMFs AMF, the second random number $RN_H$, and the first random number $RN_{M1-1}$ are used by the mobile station $MS_{M1-2}$ to generate the GTK $GTK_{M1}$, the third MAC $MAC_S$ is for the mobile station $MS_{M1-2}$ to authenticate the serving network SN, and the third random number $RN_{SM1-2}$ is used by the mobile station $MS_{M1-2}$ to calculate the $MAC_{M1}$ which can be used by the serving network SN for authenticating the mobile station $MS_{M1-2}$.

Figure 19:
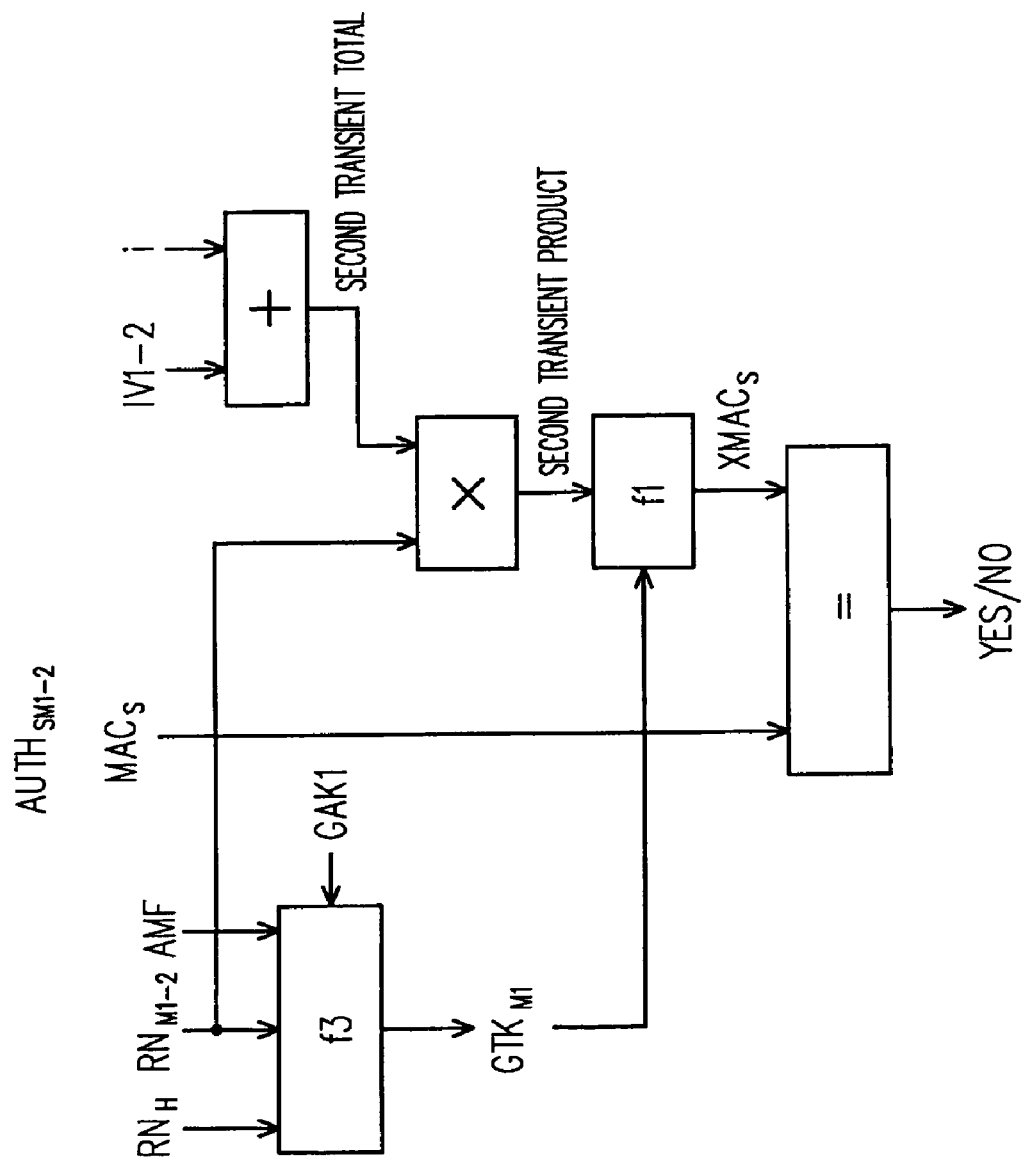
FIG. 19 illustrates how a mobile station $MS_{M1-2}$ authenticates a serving network SN in step 1602b illustrated in FIG. 16.

FIG. 19 illustrates how the mobile station $MS_{M1-2}$ authenticates the serving network SN in step 1602b illustrated in FIG. 16 according to an exemplary embodiment of the present invention. In the present embodiment, after the mobile station $MS_{M1-2}$ receives the serving network authentication data $AUTH_{SM1-2}$, the mobile station $MS_{M1-2}$ inputs the AMFs AMF, the second random number $RN_H$, and the first random number $RN_{M1-1}$ in the serving network authentication data $AUTH_{SM1-2}$ and the group authentication key GAK1 stored in the mobile station $MS_{M1-2}$ into the key generation function f3 to generate the GTK $GTK_{M1}$. After that, the mobile station $MS_{M1-2}$ continues to calculate the fourth MAC $XMAC_S$, the eXpected MAC to authenticate the serving network SN.

Next, the mobile station $MS_{M1-2}$ adds the initial value IV1-2 of the mobile station $MS_{M1-2}$ to the authentication counter i of the mobile station $MS_{M1-2}$ in the serving network to get a second transient total, and then multiplies the second transient total by and the first random number $RN_{M1-2}$ to obtain a second transient product. The mobile station $MS_{M1-2}$ inputs the second transient product and the GTK $GTK_{M1}$ into the serving network authentication message generation function f1 to generate the fourth MAC $XMAC_S$. The mobile station $MS_{M1-2}$ compares the fourth MAC $XMAC_S$ with the third MAC $MAC_S$ in the serving network authentication data $AUTH_{SM1-2}$. If the fourth MAC $XMAC_S$ is equal to the third MAC $MAC_S$, the mobile station $MS_{M1-2}$ has successfully authenticated the serving network SN, and meanwhile, the mobile station $MS_{M1-2}$ has successfully authenticated the home network HN as well for that the mobile station $MS_{M1-2}$ has to generate a correct GTK $GTK_{M1}$ in order to pass the subsequent authentication.

Figure 20:
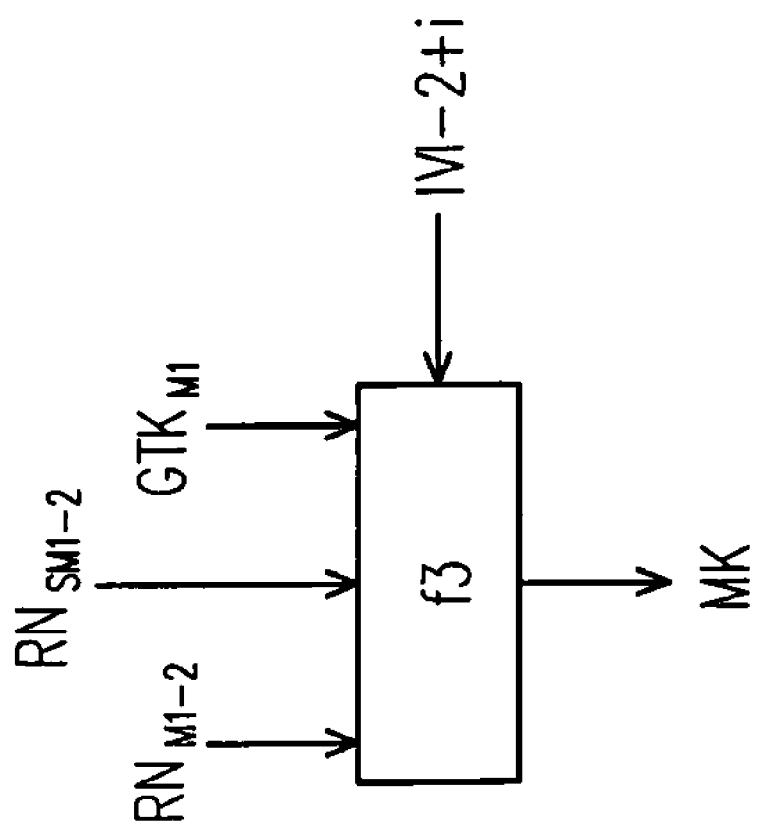
FIG. 20 illustrates a method for calculating a master key MK in step 1602c illustrated in FIG. 16.

FIG. 20 illustrates a method for calculating the master key MK in step 1602c illustrated in FIG. 16 according to an exemplary embodiment of the present invention. In the present embodiment, the serving network SN calculates the master key MK while the mobile station $MS_{M1-2}$ verifies the serving network authentication data $AUTH_{SM1-2}$ of the serving network SN, so that the time for calculating the master key MK can be saved when later on the mobile station $MS_{M1-2}$ sends the $MAC_{M1}$ for the serving network SN to authenticate the mobile station $MS_{M1-2}$ to the serving network SN and the serving network SN successfully authenticates the mobile station $MS_{M1-2}$. The serving network SN inputs the first random number $RN_{M1-2}$, the third random number $RN_{SM1-1}$, the second transient total (IV1-2+i), and the GTK $GTK_{M1}$ into the key generation function $f^3$ to calculate the master key MK.

The aforementioned step 1602c may also be executed after the mobile station $MS_{M1-2}$ sends the fifth MAC $MAC_{M1}$ to the serving network SN and the serving network SN successfully authenticates the mobile station $MS_{M1-2}$. However, in the present embodiment, the time required by the serving network SN for calculating the master key MK can be saved.

Figure 21:
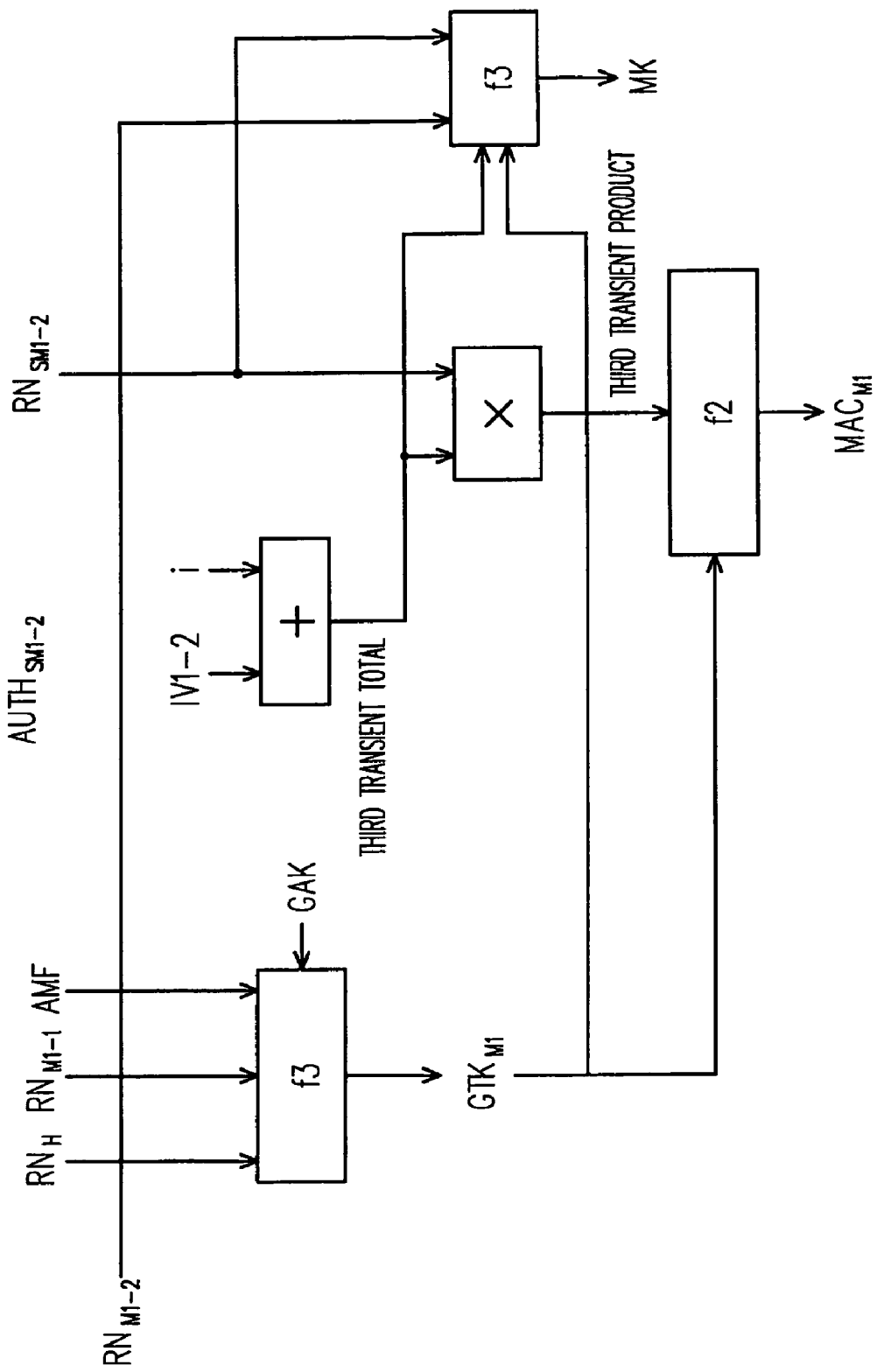
FIG. 21 illustrates a method for calculating the master key MK and generating a fifth MAC $MAC_{M1}$ in step 1602d illustrated in FIG. 16.

FIG. 21 illustrates a method for calculating the master key MK and generating a fifth MAC $MAC_{M1}$ in step 1602d illustrated in FIG. 16 according to an exemplary embodiment of the present invention. In the present embodiment, after the mobile station $MS_{M1-2}$ successfully authenticates the serving network SN as a legitimate serving network, the mobile station $MS_{M1-2}$ generates the fifth MAC $MAC_{M1}$ which allows the serving network SN to authenticate the mobile station $MS_{M1-2}$. The mobile station $MS_{M1-2}$ first adds the initial value IV1-2 which is only known to the serving network SN and the mobile station $MS_{M1-2}$ to the authentication counter i of the mobile station $MS_{M1-2}$ in the serving network SN to get a third transient total, and then the mobile station $MS_{M1-2}$ multiplies the third transient total by the third random number $RN_{SM1-2}$ in the serving network authentication data $AUTH_{SM1-2}$ to get a third transient product.

After that, the mobile station $MS_{M1-2}$ inputs the GTK $GTK_{M1}$ and the third transient product into the group authentication message generation function f2 to calculate the fifth MAC $MAC_{M1}$ which allows the serving network SN to authenticate the mobile station $MS_{M1-2}$. Besides, the mobile station $MS_{M1-2}$ also inputs the first random number $RN_{M1-2}$, the third random number $RN_{SM1-2}$, the third transient total, and the GTK $GTK_{M1}$ generated by the mobile station $MS_{M1-2}$ into the key generation function f3 to calculate the master key MK to secure subsequent communication between the mobile station $MS_{M1-2}$ and the serving network SN.

Figure 22:
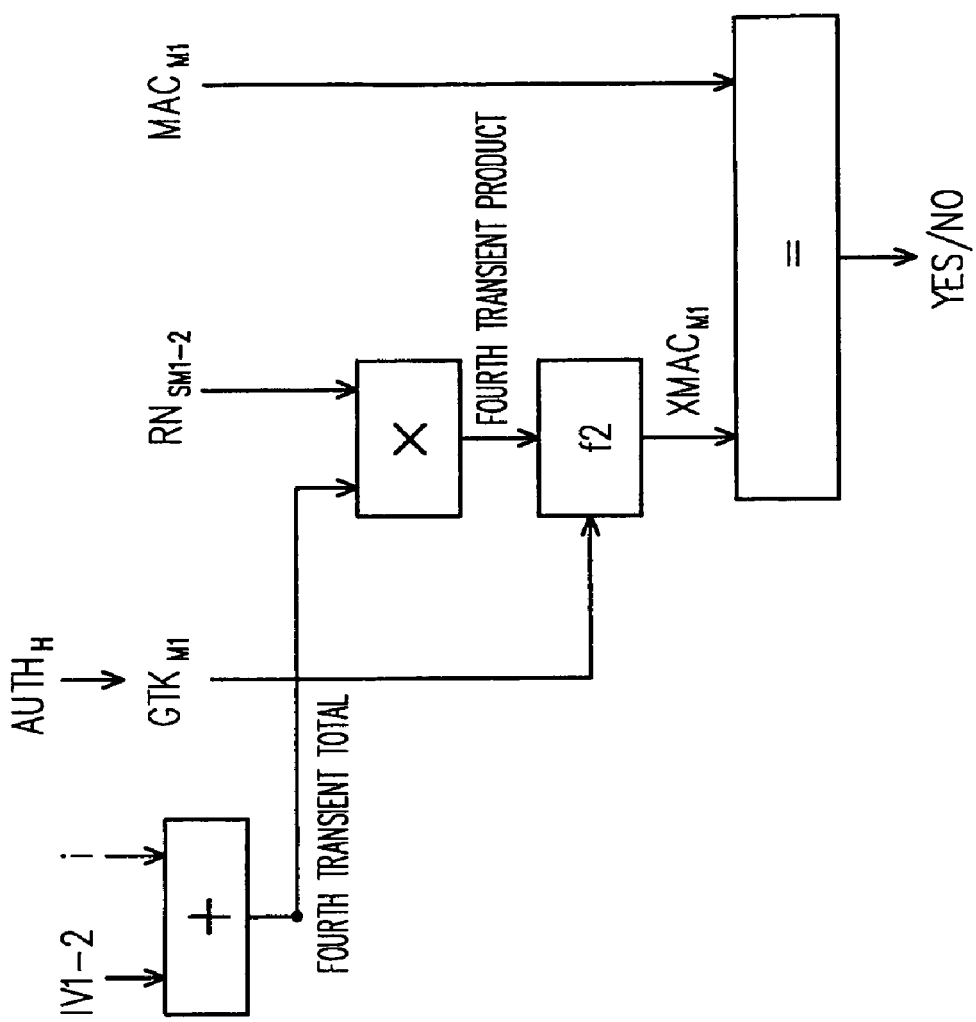
FIG. 22 illustrates a method for generating an authentication result in step 1602e illustrated in FIG. 16.

FIG. 22 illustrates a method for generating the authentication result in step 1602e illustrated in FIG. 16 according to an exemplary embodiment of the present invention. In the present embodiment, the serving network SN first adds the counter i, which records the times of authentications performed by the mobile station $MS_{M1-2}$ to the serving network SN to the initial value IV1-2 to get a fourth transient total, and then the serving network SN multiplies the fourth transient total by the third random number $RN_{SM1-2}$ to obtain a fourth transient product. After that, the serving network SN inputs the fourth transient product and the GTK $GTK_{M1}$ into the group authentication message generation function f2 to calculate a sixth MAC $XMAC_{M1}$. Finally, the serving network SN compares the sixth MAC $XMAC_{M1}$ with the fifth MAC $MAC_{M1}$ to get an authentication result.

The aforementioned authentication methods performed by the mobile station $MS_{M1-2}$ to the serving network SN and the home network HN and by the serving network SN to the mobile station $MS_{M1-2}$ are only an exemplary embodiment of the present invention but not for restricting the present invention. It should be understood by those skilled in the art that various changes in form and details may be made therein without departing from the spirit and scope of the present invention.

The mobile stations $MS_{M1-1}$ and $MS_{M1-2}$ illustrated in FIG. 7 and FIG. 16 belong to the group M1. However, foregoing example is only used for describing the present invention, and actually the mobile stations $MS_{M1-1}$ and $MS_{M1-2}$ may also belong to other groups (i.e. the mobile stations $MS_{M1-1}$ and $MS_{M1-2}$ may belong to at least one group).

The group authentication method proposed by the present invention may be applied to a cellular network. When a first mobile station in a user group visits a serving network and passes the authentication, an authentication server of the visited serving network stores a group authentication data of the user group. Later on, when a mobile station in the user group visits this serving network, the mobile station is not authenticated directly with the authentication server of the registered home network (home AAA server, H-AAA); instead, the mobile station is authenticated through the authentication server of the visited serving network (visited AAA server, V-AAA). Accordingly, in the present invention, the signalling overhead caused by the transmission of the group authentication data between the H-AAA and the V-AAA is reduced without losing the security thereof.

Figure 23:
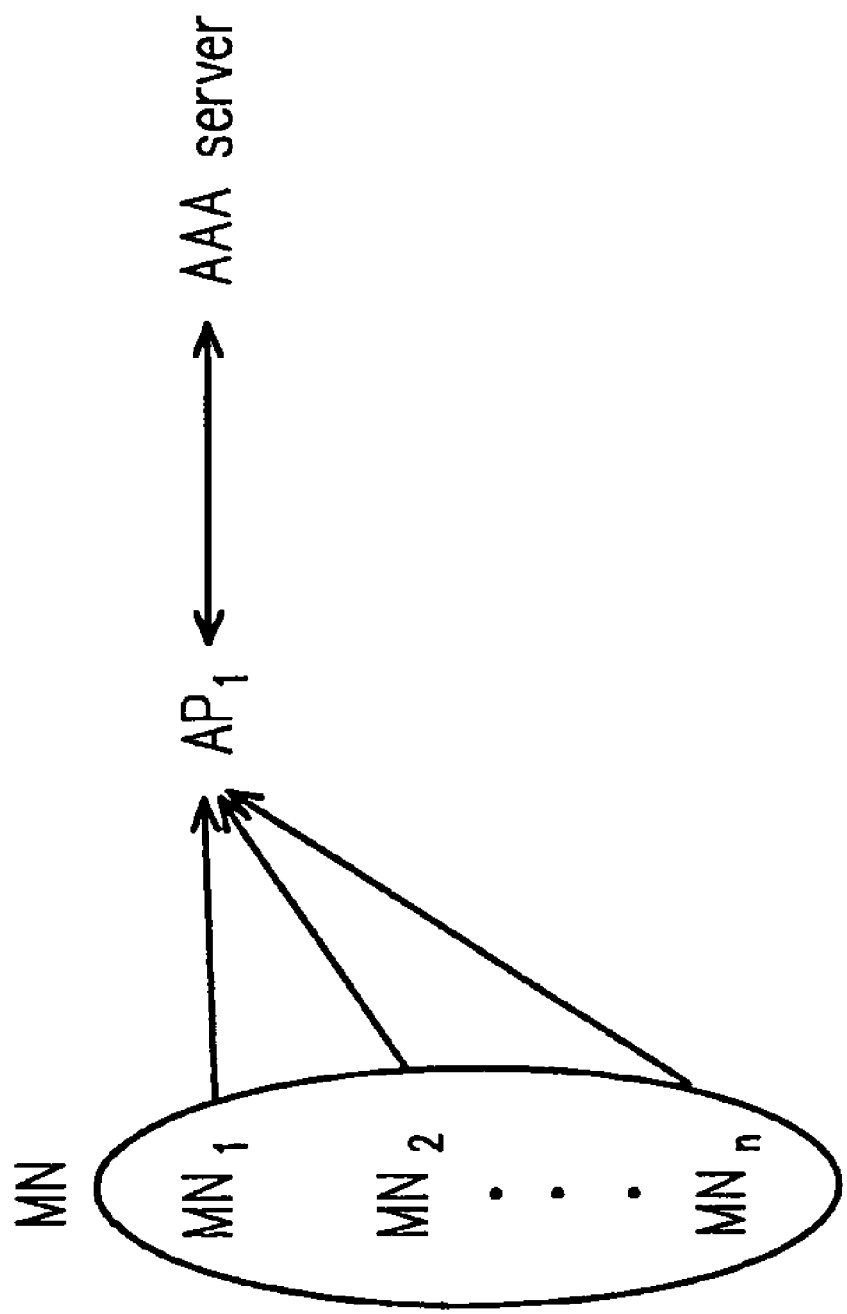
FIG. 23 illustrates an application of a group authentication method provided by the present invention in an 802.11 network.

The group authentication method proposed by the present invention may also be applied to an 802.11 network. FIG. 23 illustrates an application of the group authentication method provided by the present invention in an 802.11 network. Referring to FIG. 23, the MN group includes a plurality of mobile stations $MN_1$~$MN_n$ which hand off at the same access point (AP) $AP_1$ of the 802.11 network and the AP $AP_1$ authenticates the mobile stations $MN_1$~$MN_n$. When the AP $AP_1$ authenticates the mobile station $MN_1$, the AP $AP_1$ requests a group authentication data and a group list from the AAA server of the home network. The AAA server sends the group authentication data and the group list used for authenticating the mobile stations $MN_1$~$MN_n$ to the AP $AP_1$. After the AP $AP_1$ has authenticated the mobile station $MN_1$, the AP $AP_1$ can authenticate the mobile station $MN_2$ by directly using the group authentication data previously obtained for authenticating the mobile station $MN_1$.

The group authentication method proposed by the present invention may also be applied to a handheld game device. Handheld game devices usually exchange messages by low power radio waves, thus, the operation of these handheld game devices may be affected by the environment and the distances between the devices. Moreover, when a user wants to play an online game through a wireless network, the quality of real-time communication may be damaged due to handoff of the device. Through the group authentication method in the present invention, two handheld game devices which perform end-to-end video/audio transmission are considered as two mobile stations in the same group. When the two handheld game devices roam together, one of the two devices can perform only a local authentication to the visited serving network after the other device has performed a full authentication. Therefore, the transmission of real-time data between the two handheld game devices will not be affected by the handoff authentication procedure.

The group authentication method proposed by the present invention may also be applied to an access control system. For the security of a company, the employee authentication data in the access control system of the company has to be discarded after an authentication is performed. Through the group authentication method in the present invention, the employees in the same department or of the entire company are considered mobile stations in the same group. A simulated member can be regarded as the first member who requests for authentication so that all the authentication data can be pre-distributed from a user database to an authentication machine of the access control system before real users access the security system. In this way, when an employee is authenticated, the time required for transmitting authentication messages between the access control system and the user database can be saved.

Figure 24:
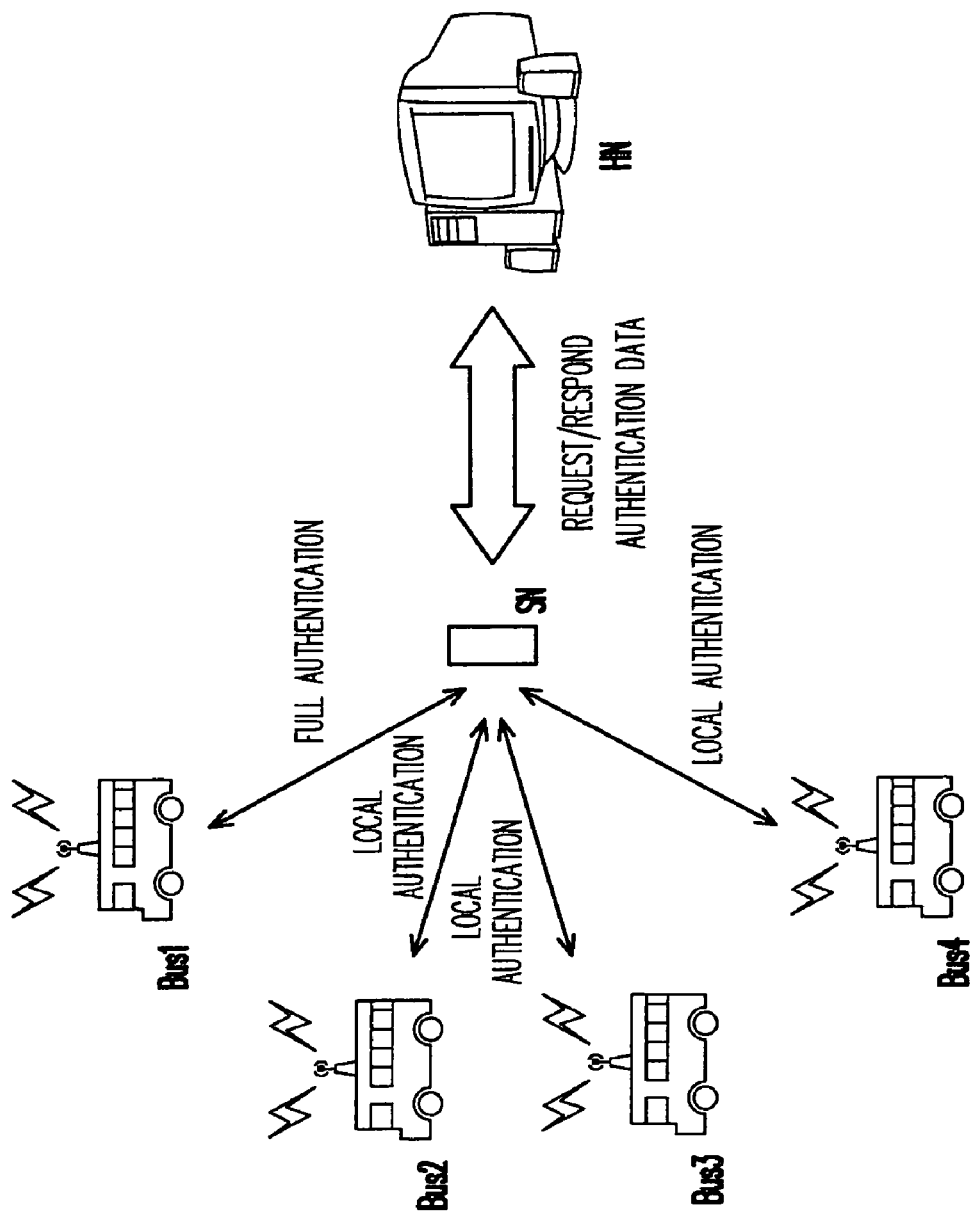
FIG. 24 illustrates an application of a group authentication method provided by the present invention for mobile routers.

FIG. 24 illustrates an application of the group authentication method proposed by the present invention for mobile routers (MRs). MRs are disposed in buses BUS1~BUS4 so that passengers on the buses BUS1~BUS4 can access the Internet through these MRs. The MRs disposed in the buses BUS1~BUS4 of the same route are considered mobile stations in the same group. These MRs tend to roam to the same serving network SN, follow the same route along with the buses BUS1~BUS4, and belong to the same home network HN. The MRs in the same group have a group authentication key. When these MRs roam along the same route, network delay caused by frequent authentication on the route can be reduced and the handoff efficiency of the MRs can be increased by using the shared group authentication data, and accordingly, high quality real-time services (for example, VoIP) can be provided in the buses.

The group authentication method proposed by the present invention may also be applied to the group communication in a terrestrial trunked radio (TETRA) network. Mobile stations in the TETRA network have a group characteristic (group communication or group movement). In other words, some mobile stations in the TETRA network may communicate with each other or move together at the same time for particular purposes. Accordingly, a group security mechanism is provided to protect the data transmitted when a mobile station group is performing group communication. Since the TETRA network itself already has a group characteristic, the group authentication method proposed by the present invention can be applied directly to the TETRA network without changing the structure of the TETRA network, so that the handoff efficiency of a mobile station group can be increased.

In summary, according to the group authentication method proposed by the present invention, when a mobile station hands off for the first time among all the mobile stations in a user group, the mobile station performs a full authentication to the serving network. During the full authentication procedure, the serving network obtains a GTK from the home network of the mobile station, so that the subsequent mobile stations in the same group can be authenticated by the serving network through local authentication by using the GTK stored in the database of the serving network, and accordingly the authentication and re-authentication of all the mobile stations in the group can be simplified as long as the GTK is valid.

Compared to the conventional techniques, the group authentication method proposed by the present invention is more suitable for a system which provides real-time video/audio communication or group communication. Two mobile stations on end-to-end video/audio communication can be considered as two mobile stations in the same group. When the two mobile stations roam together, one of the two mobile stations perform only a local authentication after the other mobile station has performed a full authentication to the serving network, so that the transmission of real-time data will not be affected by the handoff authentication procedure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A group authentication method adaptable to a communication system, wherein the communication system comprises a first group, a serving network, and a home network, the first group comprises at least one mobile station, the serving network has a first database for recording a plurality of group lists and group authentication data received from the home network, the home network pre-distributes a group authentication key and a mobile station authentication key to the mobile station and itself, the home network has a second database for recording the group lists generated by the home network, and the group authentication method comprises:
    identifying action to the mobile station through the serving network; and determining whether the communication system performs a full authentication action or a local authentication action through the serving network according to the result of the identification action, and
    a mobile station authentication and key distribution step;
    wherein the full authentication action comprises: the execution of the home network authentication, the mobile station authentication, and key distribution;
    wherein the local authentication action comprises:
    a transient authentication key obtaining step, wherein the transient authentication key obtaining step comprises: retrieving the group authentication data from the first database through the serving network, wherein the group authentication data contains which contains a group transient key (GTK) generated at the home network according to the group authentication key;
    wherein the group list comprises a group number, the group authentication key, a mobile station ID, an initial value, and a group related message, and the mobile station has the group number, the mobile station ID, and the initial value;
    wherein the identification action comprises: requesting an identification data from the mobile station through the serving network;
    generating a first random number through the mobile station, and then generating the identification data according to the mobile station authentication key and the first random number through the mobile station; and
    transmitting the identification data to the serving network from the mobile station;
    wherein the mobile station has a mobile station authentication message generation function, and the method for generating the identification data comprises:
    inputting the first random number and the mobile station authentication key into the mobile station authentication message generation function stored in the mobile station to calculate a first message authentication code (MAC); and
    combining the group number, the mobile station ID, the first random number, and the first MAC through the mobile station to generate the identification data.

2. The group authentication method according to claim 1, wherein the serving network determines whether the communication system performs the full authentication action or the local authentication action based on whether the mobile station requires the communication system to perform the full authentication action or not, the communication system performs the full authentication action if the mobile station requires the communication system to perform the full authentication action,
    the serving network determines whether the mobile station ID in the identification data received from the mobile station is in the group list recorded in the first database inside the serving network if the mobile station does not require the communication system to perform the full authentication action,
    the communication system performs the full authentication action if the mobile station ID in the identification data received from the mobile station is not in the group list recorded in the first database, and
    the communication system performs the local authentication action if the mobile station ID in the identification data received from the mobile station is in the group list recorded in the first database.

3. The group authentication method according to claim 2, wherein the full authentication action comprises: a home network authentication step; and a mobile station authentication and key distribution step.

4. The group authentication method according to claim 3, wherein the home network authentication step comprises:
transmitting the identification data to the home network through the serving network, and requesting the group list of the mobile station and the group authentication data from the home network through the serving network;
authenticating the mobile station according to the identification data through the home network; and
generating the group authentication data and transmitting the group authentication data and the group list of the mobile station to the serving network through the home network if the home network successfully authenticates the mobile station; and storing the group authentication data and the group list of the mobile station into the first database inside the serving network.

5. The group authentication method according to claim 4, wherein the home network further has the mobile station authentication message generation function, and the method is for the home network to authenticate the mobile station according to the identification data comprises:
capturing the first random number and the first MAC of the identification data through the home network, and inputting the first random number and the mobile station authentication key into the mobile station authentication message generation function through the home network to generate a second MAC; and
comparing the first MAC and the second MAC through the home network, wherein the home network successfully authenticates the mobile station if the first MAC and the second MAC are the same.

6. The group authentication method according to claim 5, wherein the home network has a key generation function and a plurality of authentication management fields (AMFs), and the method for generating the group authentication data comprises:
generating a second random number through the home network, and inputting the first random number, the second random number, the group authentication key, and the AMFs into the key generation function through the home network to calculate a group transient key (GTK); and
combining the second random number, the AMFs, the first random number, and the GTK through the home network to generate the group authentication data.

7. The group authentication method according to claim 6, wherein the mobile station authentication and key distribution step comprises:
generating a serving network authentication data according to the group authentication data, the group list, and the identification data through the serving network, and transmitting the serving network authentication data to the mobile station through the serving network;
receiving the serving network authentication data through the mobile station, and then authenticating the serving network according to the serving network authentication data through the mobile station, so as to determine whether the serving network is legitimate to the mobile station;
calculating a master key through the serving network if the serving network is legitimate to the mobile station;
calculating the master key and a fifth MAC according to the serving network authentication data through the mobile station, and then transmitting the fifth MAC to the serving network through the mobile station;
receiving the fifth MAC through the serving network, and generating a sixth MAC according to the group list recorded in the first database and the GTK through the serving network, and comparing the fifth MAC and the sixth MAC through the serving network to generate an authentication result;
transmitting the authentication result to the mobile station through the serving network; and
confirming the authentication result through the mobile station, wherein if the authentication result shows that the authentication is successful, then the serving network and the mobile station performs a secured communication by using the master key.

8. The group authentication method according to claim 7, wherein the serving network has a serving network authentication message generation function, and the method for generating the serving network authentication data comprises:
adding an authentication number of the mobile station which represents the times of authentication performed in the serving network to the initial value through the serving network to obtain a first transient total;
multiplying the first random number by the first transient total through the mobile station to obtain a first transient product;
inputting the GTK and the first transient product into the serving network authentication message generation function through the mobile station to calculate a third MAC; and
generating a third random number through the serving network, and combining the AMFs, the second random number, the first random number, the third MAC, and the third random number into the serving network authentication data through the serving network.

9. The group authentication method according to claim 8, wherein the mobile station has the serving network authentication message generation function and the key generation function, and the method for the mobile station to authenticate the serving network according to the serving network authentication data comprises:
receiving the serving network authentication data and obtaining the AMFs, the second random number, and the first random number in the serving network authentication data through the mobile station, and inputting the AMFs, the second random number, the first random number, and the group authentication key into the key generation function through the mobile station to generate the GTK;
adding the initial value to the authentication number of the mobile station in the current serving network through the mobile station to obtain a second transient total;
multiplying the second transient total by the first random number through the mobile station to obtain a second transient product;
inputting the second transient product and the GTK into the serving network authentication message generation function through the mobile station to generate a fourth MAC; and then
comparing the fourth MAC and the third MAC in the serving network authentication data through the mobile station.

10. The group authentication method according to claim 9, wherein the serving network has the key generation function, and the method for the serving network to calculate the master key comprises:

inputting the first random number, the third random number, and the GTK into the key generation function through the serving network to calculate the master key.

11. The group authentication method according to claim 10, wherein the mobile station has a group authentication message generation function, and the method for the mobile station to generate the fifth MAC comprises:

adding the initial value and the authentication number through the mobile station to obtain a third transient total and multiplying the third transient total by the third random number through the mobile station to obtain a third transient product if the mobile station successfully authenticates the serving network as a legitimate serving network; and then inputting the GTK and the third transient product into the group authentication message generation function through the mobile station to calculate the fifth MAC.

12. The group authentication method according to claim 11, wherein the method for the mobile station to generate the master key comprises:

inputting the first random number, the third random number, and the GTK into the key generation function through the mobile station to generate the master key.

13. The group authentication method according to claim 12, wherein the serving network has the group authentication message generation function, and the method for generating the sixth MAC comprises:

adding the authentication number to the initial value through the serving network to obtain a fourth transient total, and multiplying the fourth transient total by the third random number through the serving network to obtain a fourth transient product; and inputting the fourth transient product and the GTK into the group authentication message generation function through the serving network to calculate the sixth MAC.

14. The group authentication method according to claim 1, wherein the communication system further comprises a second group, and the mobile station can belong to both the first group and the second group.

15. A group authentication method adaptable to authentications between a home network, a serving network, and a user group, wherein the user group has at least one mobile station, the mobile station and the home network have a group authentication key and a mobile station authentication key, the home network has a group list, the mobile station has a mobile station ID, a group number, and an initial value, the serving network has a database for recording the group list received from the home network, and the group authentication method comprises:

generating an identification data in the mobile station, wherein the identification data comprises a first MAC and the mobile station ID; transmitting the identification data to the serving network through the mobile station;

determining whether the mobile station ID is in the group list recorded in the database through the serving network, if the mobile station ID is not in the group list recorded in the database:

transmitting the identification data to the home network through the serving network;

generating a second MAC in the home network according to the identification data;

comparing the first MAC and the second MAC, wherein the home network authenticates the mobile station successfully if the first MAC and the second MAC are the same;

generating a GTK in the home network by using the group authentication key;

transmitting a group authentication data and the group list to the serving network, wherein the group authentication data comprises the GTK; and recording the group list and the group authentication data in the database of the serving network;

if the mobile station ID is found in the group list recorded in the database:

obtaining the group authentication data from the database of the serving network according to the mobile station ID; generating a third MAC in the serving network by using the group authentication data;

transmitting a serving network authentication data to the mobile station, wherein the serving network authentication data comprises the third MAC;

generating the GTK in the mobile station by using the group authentication key recorded in the mobile station and the serving network authentication data received from the serving network;

the mobile station generating a fourth MAC in the mobile station by using the comparing the third MAC and the fourth MAC in the mobile station, wherein the mobile station authenticates the serving network and the home network successfully if the third MAC and the fourth MAC are the same;

calculating a master key in the serving network by using the group authentication data and the identification data received from the mobile station;

generating the master key and a fifth MAC in the mobile station by using the serving network authentication data and the GTK;

transmitting the fifth MAC to the serving network through the mobile station;

generating a sixth MAC in tile serving network by using the group authentication data;

comparing the fifth MAC and the sixth MAC in the serving network, wherein the serving network authenticates the mobile station successfully if the fifth MAC and the sixth MAC are the same; and both the serving network and the mobile station transmitting encrypted data by using the master key, so as to perform a secured communication between the serving network and the mobile station.

16. The group authentication method according to claim 15, wherein the group list comprises the group number, the group authentication key, the mobile station ID, the initial value, and a group related message.

17. The group authentication method according to claim 15, wherein the identification data further comprises a flag, and the flag is used for indicating that whether the mobile station requests the serving network to obtain new group authentication data from the home network or not.

18. The group authentication method according to claim 15, wherein the method for generating the first MAC comprises:

generating a first random number in the mobile station; and calculating the first MAC by using the first random number and the mobile station authentication key.

19. The group authentication method according to claim 15, wherein the identification data further comprises the first random number and the group number.

20. The group authentication method according to claim 15, wherein the method for generating the second MAC in the home network according to the identification data comprises:

calculating the second MAC by using the first random number in the identification data and the mobile station authentication key recorded in the home network.

21. The group authentication method according to claim 15, wherein the home network has a plurality of AMFs, and the method for generating the GTK in the home network by using the group authentication key comprises:

generating a second random number in the home network; and calculating the GTK by using the AMFs, the second random number, the first random number, and the group authentication key.

22. The group authentication method according to claim 21, wherein the group authentication data further comprises the AMFs, the first random number, and the second random number.

23. The group authentication method according to claim 22, wherein the method for generating the third MAC in the serving network by using the group authentication data comprises:

calculating the third MAC by using the initial value in the group list, the number of the mobile station authenticating the serving network, the first random number, and the GTK.

24. The group authentication method according to claim 22, wherein the serving network generates a third random number, and the serving network authentication data further comprises the first random number, the second random number, the AMFs, and the third random number.

25. The group authentication method according to claim 24, wherein the method for generating the GTK in the mobile station by using the serving network authentication data and generating the fourth MAC in the mobile station by using the GTK comprises:

calculating the GTK by using the AMFs, the first random number, the second random number, and the group authentication key record in the mobile station; and calculating the fourth MAC by using the GTK, the initial value, and the number of the mobile station authenticating the serving network.

26. The group authentication method according to claim 24, wherein the method for calculating the master key in the serving network by using the group authentication data comprises:

calculating the master key by using the GTK, the first random number, and the third random number.

27. The group authentication method according to claim 25, wherein the method for generating the master key and the fifth MAC in the mobile station by using the serving network authentication data and the GTK comprises:

generating the fifth MAC by using the third random number, the initial value, the number of the mobile station authenticating the serving network, and the GTK; and calculating the master key by using the GTK, the first random number, and the third random number.

28. The group authentication method according to claim 24, wherein the method for generating the sixth MAC in the serving network by using the group authentication data comprises:

generating the sixth MAC by using the third random number, the initial value, the number of the mobile station authenticating the serving network, and the GTK.

29. The group authentication method according to claim 15, wherein the communication system further comprises a second group, and the mobile station can belong to both the first group and the second group.

* * * * *